US007329811B2

(12) United States Patent
Hirano

(10) Patent No.: US 7,329,811 B2
(45) Date of Patent: Feb. 12, 2008

(54) MUSICAL SOUND GENERATION DEVICE CAPABLE OF EFFECTIVELY UTILIZING THE ACCESS TIMING FOR AN UNUSED SLAVE SOUND SOURCE

(75) Inventor: Tetsuya Hirano, Hamamatsu (JP)

(73) Assignee: Kabushiki Kaisha Kawai Gakki Seisakusho, Hamamatsu-shi (JP)

( * ) Notice: Subject to any disclaimer, the term of this patent is extended or adjusted under 35 U.S.C. 154(b) by 44 days.

(21) Appl. No.: 10/581,971

(22) PCT Filed: Nov. 29, 2004

(86) PCT No.: PCT/JP2004/017685

§ 371 (c)(1),
(2), (4) Date: Jun. 7, 2006

(87) PCT Pub. No.: WO2005/057547

PCT Pub. Date: Jun. 23, 2005

(65) Prior Publication Data

US 2007/0119289 A1 May 31, 2007

(30) Foreign Application Priority Data

Dec. 8, 2003 (JP) ............................ 2003-408393
Dec. 11, 2003 (JP) ............................ 2003-412927

(51) Int. Cl.
*G01H 7/00* (2006.01)

(52) U.S. Cl. ........................................................ 84/604

(58) Field of Classification Search ........... 84/602–604
See application file for complete search history.

(56) References Cited

U.S. PATENT DOCUMENTS

| | | | | |
|---|---|---|---|---|
| 5,541,360 A * | 7/1996 | Kaneko | | 84/660 |
| 5,584,034 A * | 12/1996 | Usami et al. | | 712/35 |
| 5,625,158 A * | 4/1997 | Ichiki | | 84/603 |
| 5,670,728 A * | 9/1997 | Ogai et al. | | 84/607 |

FOREIGN PATENT DOCUMENTS

| | | |
|---|---|---|
| JP | 5-289660 | 11/1993 |
| JP | 6-282270 | 10/1994 |
| JP | 07-181974 | 7/1995 |
| JP | 9-146551 | 6/1997 |
| JP | 11-109974 | 4/1999 |
| JP | 11-237885 | 8/1999 |

* cited by examiner

*Primary Examiner*—Jeffrey W Donels
(74) *Attorney, Agent, or Firm*—Oblon, Spivak, McClelland, Maier & Neustadt, P.C.

(57) ABSTRACT

A musical tone generating apparatus, which is capable of effectively utilizing the access timing for an unused slave sound source, is provided.

The musical tone generating apparatus is composed of a master sound source 1000, which comprises a mode switching means 101, an accumulator 102, an upper-address processing means 103, an address memory for a second sound source 104, an address-switching output means 105, a waveform data register 106, a sample buffer 107, an interpolation coefficient memory 108, an interpolation coefficient extracting means 109, a sample interpolation means 110 and a selection means 111.

4 Claims, 18 Drawing Sheets

DWa: Data obtained in former half
DWb: Data obtained in latter half

Ca=(Csel==0)? C0 : C1 ;
Cb=(Csel==0)? C1 : C2 ;
Cc=(Csel==0)? C2 : C3 ;
Cd=(Csel==0)? C3 : C0 ;

| ItO | SNGF4 | Csel |
|---|---|---|
| 0 | 0 | 0 |
| 0 | 1 | 0 |
| 1 | 0 | 0 |
| 1 | 1 | 1 |

Whenever two samples proceed, data are renewed as in the form of Z3←Z1, Z2←DWa and Z1←DWb

| Functions of circuit blocks and the like | Number of output terminals | Number of input terminals |
|---|---|---|
| A: External memory access circuit | 24 | 16 |
| B: Address-output/data-input for slave sound source | 7 | 4 |
| 1105a: Keyboad scan circuit | 5 | 8 |
| 150: Data-output/address-input for master sound source | 4 | 7 |

MUSICAL SOUND GENERATION DEVICE CAPABLE OF EFFECTIVELY UTILIZING THE ACCESS TIMING FOR AN UNUSED SLAVE SOUND SOURCE

TECHNICAL FIELD

The present invention relates to a musical tone generating apparatus including a plurality of sound source chips having a function of sharing a waveform memory.

BACKGROUND ART

As a means for increasing the number of simultaneous sound generation, there are systems using a plurality of sound source chips. A method for sharing a waveform memory with a plurality of sound source chips to avoid an increase in the cost required by provision of plural waveform memories is adopted in some of such systems.

For example, a structure, wherein at least two sound source chips are included, and musical tones are generated by reading out respective data from a common waveform memory with respective system counters synchronized (with memory access being performed under the control of a common clock), is utilized in an electronic musical instrument or the like.

FIG. 22 shows a conventional musical tone generating apparatus, which uses two sound source chips 1000 and 1001 sharing a waveform memory 1002 (in a two-chip mode). This apparatus has an address bus from a master sound source 1000 connected to the waveform memory 1002, and a data bus from the waveform memory 1002 connected to the master sound source 1000 and the slave sound source 1001.

Although the address bus from the master sound source to the waveform memory 1002 comprises a 24-bit bus, the slave sound source 1001 and the master sound source 1000 are serially connected together as shown in FIG. 23. A slave address is transferred to the side of the master sound source 1000 by being subjected to parallel-serial conversion on the side of the slave sound source 1001 to be divided into four sections, being serially transmitted to the master sound source by 6 bits for each one channel time. The transferred slave address is subjected to serial-parallel conversion on the side of the master sound source 1000 to be transformed into 24 bits.

The master sound source 1000 performs memory access twice, one in a former half and one in a latter half of one channel operation. A data read out by memory access in the former half is received by the master sound source 1000, and a data read out by memory access in the latter half is received by the slave sound source 1001.

On the other hand, FIG. 24 shows a state wherein in accordance with an external signal, a mode change has been made to effect a one-chip mode using only the sound source 1000 (single sound source mode) in the above-mentioned structure. In this time, the sound source 1000 outputs an address to the waveform memory 1002, and the waveform memory outputs a data to the sound source 1000 as shown in the timing chart of FIG. 25. After that, a state without processing continues for a while, and the same processing as the above-mentioned processing is repeated in a subsequent channel time.

DISCLOSURE OF THE INVENTION

Problems that the Invention is to Solve

In a system including a plurality of sound source chips, only one sound source chip is used without an increase in the number of simultaneous sound generation in some cases. In this case, the access timing allotted to the sound source (slave sound source) other than a main sound source (master sound source) is vacant.

In some cases, the unused access timing is left as it is (see a left middle portion of FIG. 10 described later), or, e.g., a method for extending the access timing for the master sound source (see a right middle portion of FIG. 10 described later) is adopted so as to make it possible to use a slow memory.

However, when the access time is sufficient only by the presence of the access timing for the master sound source, it is meaningless to extend the address timing for the master sound source. Even if the access timing for the slave sound source is utilized, it is impossible to expect easy control of a reproduced musical tone, improvement in sound quality and the like.

On the other hand, in a structure wherein the above-mentioned time-division operation is made by using a plurality of sound sources to increase the number of simultaneous sound generation, an increase in the number of channels generally makes a memory access cycle time shorter. The memory access cycle time contains an address output delay time required for inputting an address in the waveform memory, an address access time (time period required from output of an address to output of a data) and a setup time (minimum time required for stabilizing an input signal prior to an effective clock pulse edge in order to correctly read the input). Most parts of the memory access cycle time are allotted to the address access time, shortening an effective time for obtaining a data output from the waveform memory after the lapse of the address access time.

In the above-mentioned conventional structure wherein two sound source chips, which share a waveform memory, is simultaneously used, the sound source chips cannot be always completely synchronized in a two-chip mode since skew is caused between the system clocks of the two sound source chips by an adverse effect of wiring on the substrate or a difference between the threshold values of the clock input buffers as shown in FIGS. 26(*a*), (*e*) and (*f*) in some cases.

In a case where a data is received by the slave sound source in such a situation that the effective time for obtaining a data is short, when skew is caused between the system clocks of the two sound source chips (between FIGS. 26(*a*) and (*e*) or between FIGS. 26(*a*) and (*f*)), there is a possibility that a correct data cannot be obtained. For example, it is assumed that in the case of FIG. 26, one clock pulse is 27 nsec, and one memory access is performed with four clock pulses and at 118 nsec. When it is set that the maximum output delay time of an address is 23 nsec, that the address access time is 90 nsec and that the minimum setup time of a data is 5 nsec, the total time is 118 nsec. Accordingly, it is impossible to accept the presence of a clock phase shift between the master sound source and the slave sound source.

In order to avoid such a state, a fast memory is used to have a sufficient margin in some cases. However, it is not practical to adopt this solution since such a fast memory is expensive in terms of unit price per bit. It is undesirable that a memory to be adopted is determined by the presence or absence of a slave sound source.

The present invention is proposed in consideration of these problems. It is an object of the present invention to provide a musical tone generating apparatus capable of effectively utilizing the access timing for an unused slave sound source.

It is another object of the present invention to provide a musical tone generating apparatus, which is configured so that a sound source other than a sound source serving as a master in memory access can reliably obtain a data when a memory access cycle time is short in a structure with the plural sound sources reading out data in a shared waveform memory.

Means for Solving the Problem

In order to solve the problem, the present invention provides a musical tone generating apparatus, which includes sound sources capable of reading out a waveform from a waveform memory at a plurality of access timings in a timing for one channel, comprising:

a mode switching means for performing switching between a mode to use a solo sound source and a mode to use a plurality of sound sources;

an accumulator for accumulating designated pitches;

an upper-address processing means for processing an upper data (integral part) in the accumulator into a consecutive address;

an address memory for a second sound source, the address memory receiving an address to the waveform memory generated from a second sound source and storing the address therein;

an address-switching output means for performing switching between a first address indicated by an upper data of the accumulator and a second address stored in the address memory for a second sound source and outputting a selected one of the addresses in response to a mode switching signal from the mode switching means and an access timing, the address-switching output means outputting the first address and a consecutive address in the mode to use a solo sound source, the consecutive address being processed to precede or follow the first address by the upper-address processing means;

a waveform data register for storing waveform data read out from the waveform memory based on the output addresses;

a sample buffer wherein waveform data, which have been read out at the previous access timing and have been stored in the waveform data register, are stored by (an interpolation point number−1);

an interpolation coefficient memory for storing interpolation coefficient data;

an interpolation coefficient extracting means for extracting corresponding interpolation coefficients from the interpolation coefficient memory, based on lower data (dismal part) in the accumulator;

a sample interpolation means, wherein the waveform data, which have been respectively stored in the waveform register and the sample buffer, are subjected to interpolation based on interpolation coefficients extracted by the interpolation coefficient extracting means; and a selection means, wherein the waveform data, which have been respectively stored in the waveform register and the sample buffer and have been input into the sample interpolation means, are selected in response to a mode switching signal from the mode switching section and an address value indicated by the upper data of the accumulator.

In accordance with the structure described above, in a case where the mode to use a solo sound source is selected at the mode switching means, when the access timing for the unused second sound source is allotted to an access timing for the used sound source, the upper limit of the range of reproduced pitches can be expanded by one octave.

The present invention that is defined in Claim 3 provides a musical tone generating apparatus, which includes a master sound source serving as a master in memory access and a slave sound source serving as a slave in the memory access, both sound sources performing the memory access to a waveform memory with a common clock; comprising:

the slave sound source including a transmitting means for transmitting a slave address for reading out a waveform, to the master sound source;

the master sound source including a receiving means for receiving the slave address transmitted from the transmitting means of the slave sound source;

the master sound source including a transmitting means for transmitting a waveform data for the slave sound source to the slave sound source, the waveform data being read out form the waveform memory; and the slave sound source including a receiving means for receiving the waveform data for the slave sound source, which has been transmitted from the transmitting means of the master sound source;

wherein the master sound source operates so that a master address, which has been obtained by operation, is output to the waveform memory in the former half of the operation time for one channel, and that a slave address, which has been transmitted from the transmitting means of the slave sound source and has been received by the receiving means of the master sound source, is output to the waveform memory in the latter half of the operation time for the one channel, and the master sound source also operates so that a waveform data for the slave sound source, which has received from the waveform memory, is supplied to the transmitting means of the master sound source and is transmitted to the receiving means of the slave sound source in the latter half of the operation time for the one channel.

In accordance with the above-mentioned structure, when the mode to use the plurality of sound sources is selected, the master sound source operates so that a master address, which has been obtained by operation, is output to the waveform memory in the former half of the operation time for one channel, and that a slave address, which has been transmitted from the transmitting means of the slave sound source and has been received by the receiving means of the master sound source, is output to the waveform memory in the latter half of the operation time for the one channel, and the master sound source also operates so that a waveform data for the slave sound source, which has received from the waveform memory, is supplied to the transmitting means of the master sound source and is transmitted to the receiving means of the slave sound source in the latter half of the operation time for the one channel. As a result, the slave sound source can obtain a waveform data for the slave sound source, without being affected by the memory access cycle time. In other words, the output of an address and the obtaining of a waveform data for the slave sound source, which are supposed to be performed by the slave sound source, are mainly performed by the master sound source. Accordingly, the slave sound source 1001 can reliably obtain such a waveform data for the slave sound source, irrespective of the length of the memory access cycle time.

In the above-mentioned structure, it is preferred that the receiving means of the master sound source, which receives the slave address transmitted from the transmitting means of the slave sound source, receive the slave address at an edge of an inverted clock pulse, and that the receiving means of the slave sound source, which receives the waveform data for the slave sound source transmitted from the transmitting means of the master sound source, receive the waveform data at an edge of an inverted clock pulse (Claim 4).

When the structure defined in Claim 3 is simply described, the musical instrument is configured so that the master sound source and the slave sound source are provided, and that while both of the master sound source and the slave sound source share the waveform memory, the master sound source controls the access to the waveform memory to perform serial transmission and reception between the master sound source and the slave sound source. When the structure defined in Claim 4 is adopted in the above-mentioned structure, the timing for receiving a serial data can be set not only at a rise of a clock pulse as normally done but also at a fall of a clock pulse (an edge of an inverted clock pulse). Accordingly, it is possible to finely set the timing in a case where the time for the one channel (which is used for serial transmission) is short, (as in a case where there are only eight clock pulses as described later).

EFFECT OF THE INVENTION

In accordance with the musical tone generating apparatus defined in Claims 1 and 2 in connection with the present invention, it is possible to have an excellent advantage of making efficient use of the access timing for an unused sound source to be capable of expanding the upper limit of the range of reproduced pitches by one octave.

In accordance with the musical tone generating apparatus according to Claim 3 in connection with the present invention, it is possible to have such an advantage that a slave sound source other than a master sound source serving as a master in memory access can reliably obtain a data even when a memory access cycle time is short in a structure with plural sound sources reading out data in a shared waveform memory.

EXPLANATION OF REFERENCE NUMERALS

Figure 1:
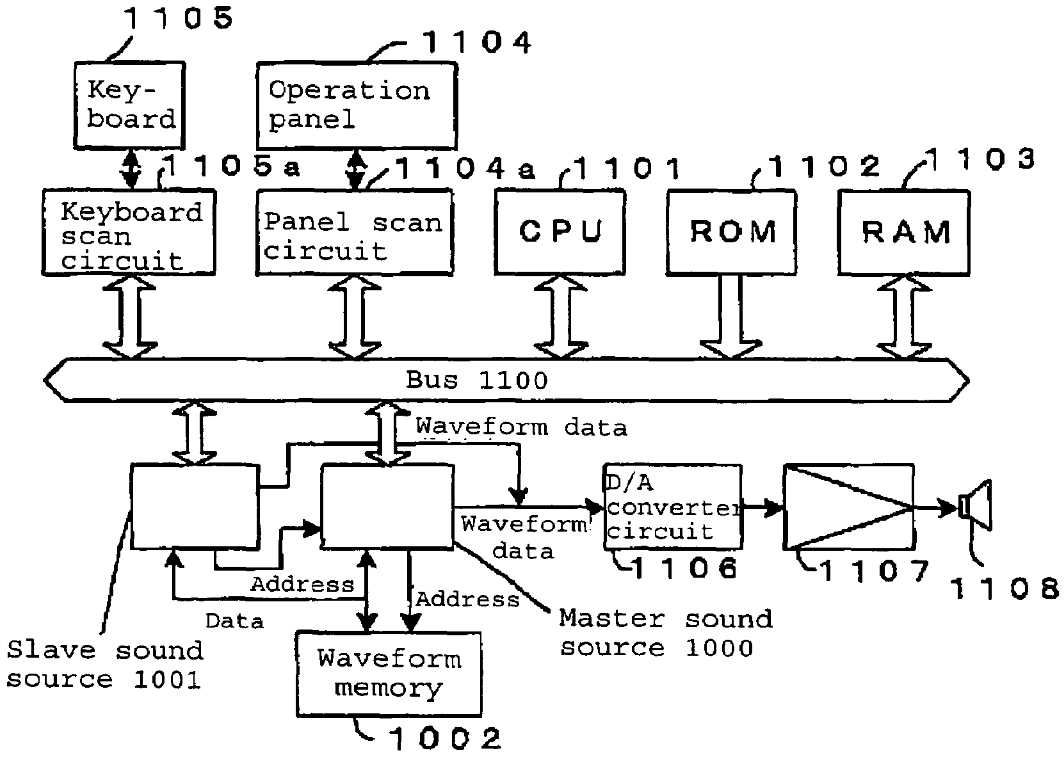
FIG. 1 is a schematic circuit diagram of an electronic musical instrument, to which a waveform reproducing apparatus according to the present invention is applied.

101 mode switching section
102 accumulator
103 upper-address processing section
104 address memory for a second sound source
105 address switching output section
106 waveform register
107 sample buffer
108 interpolation coefficient memory
109 interpolation coefficient extracting section
110 sample interpolation section
110*a* to 110*d* multiplier
110*e* multiplier
111 selection section
120 accumulator
121 adder
122 adder
123 selector
124 barrel shifter
130 WAMtr register
131 LSB controller
140 and 142 transmitting section
141 and 143 receiving section
A external memory access circuit
B address-output/data-input for slave sound source
150 data-output/address-input for mater sound source
160, 160*a*, 160*b*, 170, 170*a* and 170*b* switching section
1000 master sound source
1001 slave sound source
1002 waveform memory
1100 system bus
1101 CPU
1102 ROM
1103 RAM
1104 operation panel
1104*a* panel scan circuit
1105 keyboard
1105*a* keyboard scan circuit
1106 D/A converter
1107 amplifier
1108 speaker

BEST MODE FOR CARRYING OUT THE INVENTION

Now, embodiments of the present invention will be described, referring to the modes shown in the accompanied drawings.

Embodiment 1

FIG. 1 is a schematic circuit diagram of an electronic musical instrument (such as an electronic organ), to which a waveform reproducing apparatus according to the present invention is applied.

The electronic musical instrument is configured so that different timbres are allotted to upper, middle and lower keyboards, foot pedals or the like, the keyboards being split into left and right portions so as to be capable of setting different timbres at respective positions in both portions. The number of the channels, which are required for simultaneously generating the respective musical tones when pressing, e.g., keys on the keyboard, is beyond the number of the channels required for thirty-two timbres in many cases.

The electronic musical instrument is configured by interconnecting a CPU 1101, a ROM 1102, a RAM 1103, a panel scan circuit 1104*a*, a keyboard scan circuit 1105*a*, a master sound source 1000 and a slave sound source 1001 through a system bus 1100 as shown in FIG. 1. The system bus 1100 is used for transmitting and receiving an address signal, a data signal, a control signal and the like.

The CPU 1101 controls the entire electronic musical instrument, being operated according to a control program stored in the ROM 1102.

The ROM 1102 stores various kinds of data to be referred to by the CPU 1101 in addition to the control program.

The RAM 1103 is used for temporarily storing various kinds of data when the CPU 1101 performs various kinds of processing. The RAM 1103 has registers, counters, flags and the like defined therein. Explanation will be made about main elements among these elements. Elements other than the elements described below will be explained when needed.

(a) a timbre setting flag: Data are stored to indicate through which channel a timbre generated from the master sound source 1000 or the slave sound source 1001 is generated according to the setting on an operation panel 1104 described later.

(b) one chip mode flag: Although the electronic musical instrument includes the master sound source 1000, the slave sound source 1001 and a waveform memory 1002 commonly used by both sound sources as described later with respect to generation of a musical tone, there are a case where a musical tone is generated only by the master sound source according to the setting on the timbre setting flag, and a case where a player operates the operation panel 1104 to alter the timbre setting flag so as to generate a musical tone only by the master sound source. In this case, the flag is set (=1). At this time, a mode switching section 101 described later refers to the one chip mode flag and outputs a mode-switching signal (SNGF4) (0: two-chip mode, 1: one-chip mode).

The panel scan circuit 1104*a* is connected to the operation panel 1104. The operation panel 1104 has an option to use only one of the sound sources (e.g., only the master sound source 1000) in, e.g., a case without increasing the number of simultaneous sound generation, such as a case where sixty-four channels are reduced to thirty-two channels (as in a case where the number of timbres is small). In such a case, the number of the channels may be set at, e.g., thirty-two channels by setting the timbre setting flag through timbre selection on the operation panel 1104. There is also a case where a player operates the operation panel 1104 to alter the timbre setting flag so as to generate a musical tone only by the master sound source as described above. When a timbre has a wide range of pitch changes, a musical tone is generated only by the master sound source in some cases. Although not shown, there are also provided an LED indicator for indicating the setting states of respective switches, an LCD for displaying various kinds of messages, and the like.

When the one-chip mode flag is set in accordance with the above-mentioned channel setting or the operation of the operation panel by a player, the apparatus is set in such a state that only the master sound source 1000 is used. When the one-chip mode flag is cancelled in accordance with a change in the above-mentioned channel setting or the operation of the operation panel 1104, the apparatus is set in such a state that the master sound source 1000 and the slave sound source 1001 are used to be capable of performing channel setting with a number beyond thirty-two channels.

The panel scan circuit 1104*a* scans each switch on the operation panel 1104 in response to a command from the CPU 1101 and prepares a panel data based on a signal indicative of a switch-on state or a switch-off state of each switch obtained by this scanning operation, each one bit in the panel data corresponding to each switch. For example, each one bit represents the switch-on state by "1" and a switch-off state by "0". The panel data is transmitted to the CPU 1101 through the system bus 1100. The panel data is used to determine whether the on-event or the off-event of a switch on the operation panel 1104 has been caused or not.

The panel scan circuit 1104*a* transmits a display data from the CPU 1101 to the LED indicator and the LCD on the operation panel 1104. By this operation, according to the data transmitted from the CPU 1101, the LED indicator is turned on or off, and a message is displayed on the LCD.

The keyboard scan circuit 1105*a* detects a key-on data generated at the keyboard 1105. The keyboard 1105 has the respective keys provided with a two-position switch. When it is detected that a key on the keyboard 1105 has been depressed to a certain depth or above, a key-on signal corresponding to the pitch data (key number) of the depressed key is generated, and a velocity is generated based on the speed of the depressed key, which has passed between the two positions. These data are transmitted as key-on data to the keyboard scan circuit 1105*a*. Examples of the two-position switch are an optical sensor, a pressure sensor or other sensors, which can detects that the corresponding key has been depressed to a certain depth or above. When the keyboard scan circuit 1105*a* receives the key-on data from a two-position switch, the keyboard scan circuit transmits the data to the CPU 1101.

Based on the reference to the timbre setting flag and the one-chip mode flag in the RAM 1103 by the CPU 1101, key-on data, which are transmitted from the keyboard scan circuit 1105*a*, are transmitted to the master sound source 1000, or the master sound source 1000 and the slave sound source 1001 so as to correspond to the respective channels.

The master sound source 1000 and the slave sound source 1001 share the single waveform memory 1002 and transmit a read-out address to the waveform memory 1002 to read out the corresponding original data from the waveform memory. After the original data thus read out is interpolated, the interpolated data is multiplied by the envelope for each timbre generated by the same circuit. The multiplied results are accumulated so as to correspond to channels with the waveform data of the respective timbres set therein, and the accumulated data are output as waveform data to outside. It should be noted that although the slave sound source 1001 is configured in a normal sound source, a read-out address for the waveform memory 1002, which is generated from the slave sound source, is input into the master sound source 1000 and is temporarily stored in an address memory for a second sound source 104 as described later. Original data read out from the waveform memory 1002 are input into the respective sound sources 1000 and 1001. A waveform data, which has been output from these sound sources, is input into a D/A converter circuit 1106 to be subjected to digital-to-analog conversion, is amplified by an amplifier 1107 and is output as a musical tone to outside through a speaker 1108.

Figure 2:
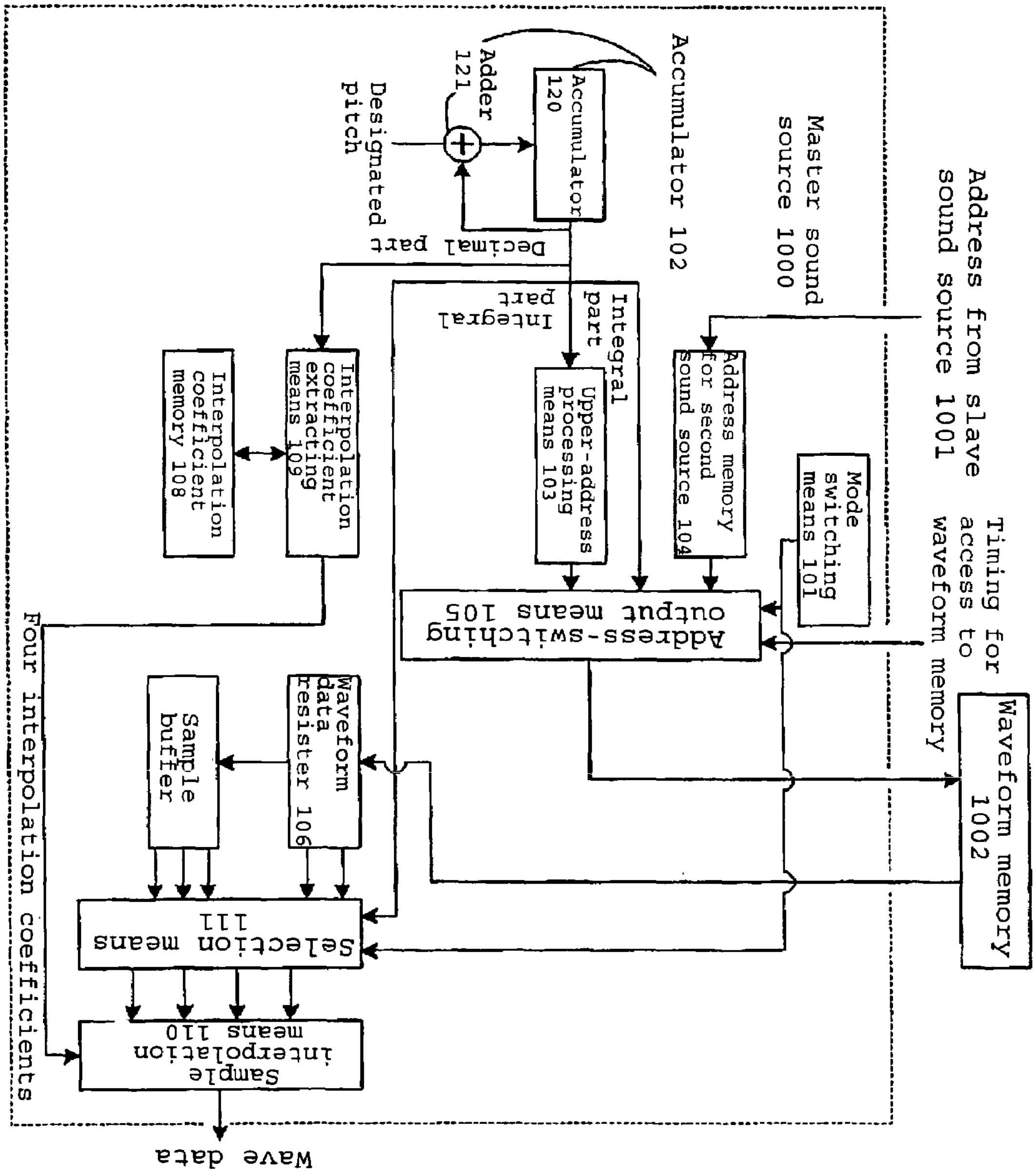
FIG. 2 is a schematic view showing the functional block diagram of a master sound source 1000.

As shown in FIG. 2, the master sound source 100 includes the mode switching means 101, an accumulator 102, an upper-address processing means 103, the address memory for a second sound source 104, an address-switching output means 105, a waveform data register 106, a sample buffer 107, an interpolation coefficient memory 108, an interpolation coefficient extracting means 109, a sample interpolation means 110 and a selection means 111.

The master sound source 1000 is designed as a custom-made LSI and contains the buffer, the register, the fixed memory for storing predetermined coefficients for interpolation, and the like, which are not shown. The above-mentioned means are composed of these elements.

Among these means, the mode switching means 101 outputs a mode switching signal (SNGF 4) to the address-switching output means 105, a selector 123 of the accumulator 102 and an input of an AND circuit forming the selection means 111 described later, referring to the one-chip flag mode set in the RAM 1103 by the CPU 1101 (0: two-chip mode, which means a mode to use plural sound sources wherein the master sound source 1000 and the slave sound source 1001 are used; 1: one-chip mode, which means a mode to use a single sound source wherein only the master sound source 1000 is used).

Figure 3:
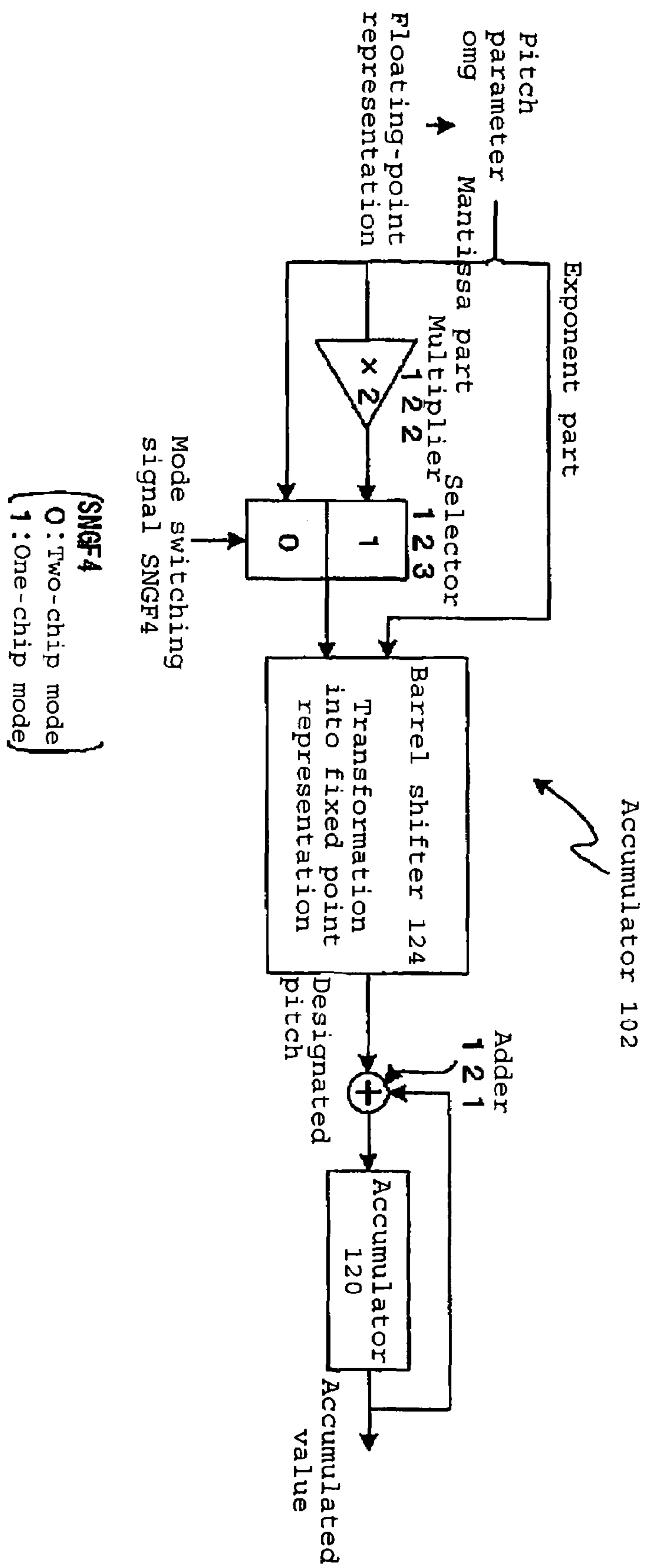
FIG. 3 is a schematic view showing the structure in an accumulator 102.

The accumulator 102 is configured as shown in FIG. 3 described later to output a designated pitch and is mainly composed of an accumulator 120 for accumulating the value of the present pitch and the value of the previous pitch, and an adder 121. In other words, when a pitch parameter (omg), which is stored in a floating-point representation in the fixed memory, is read out, the exponent part of the pitch parameter is input into a barrel shifter 124, and the mantissa part is directly input into a multiplier 122 and the selector 123 as shown in this figure. The multiplier 122 multiplies the value of the mantissa part twofold. According to the mode switching signal (SNGF 4) from the mode switching means 101, the selector 123 inputs the value of the mantissa part into the barrel register as it is in the two-chip mode, while the selector inputs the twofold value of the mantissa part into the barrel register in the one-chip mode. The exponent part and the mantissa thus processed are transformed into a fixed point representation by the barrel shifter 124 and are input into as a designated pitch into the adder 121. After that, the value of the present pitch and the value of the previous pitch are accumulated as described above. The reason why a twofold value of the mantissa part is input into the barrel shifter 124 in the one-chip mode is that it is possible to set a twofold pitch in terms of absolute value in the one-chip mode in comparison with the two-chip mode since the pitch parameter is normalized with a settable maximum value.

Figure 4:
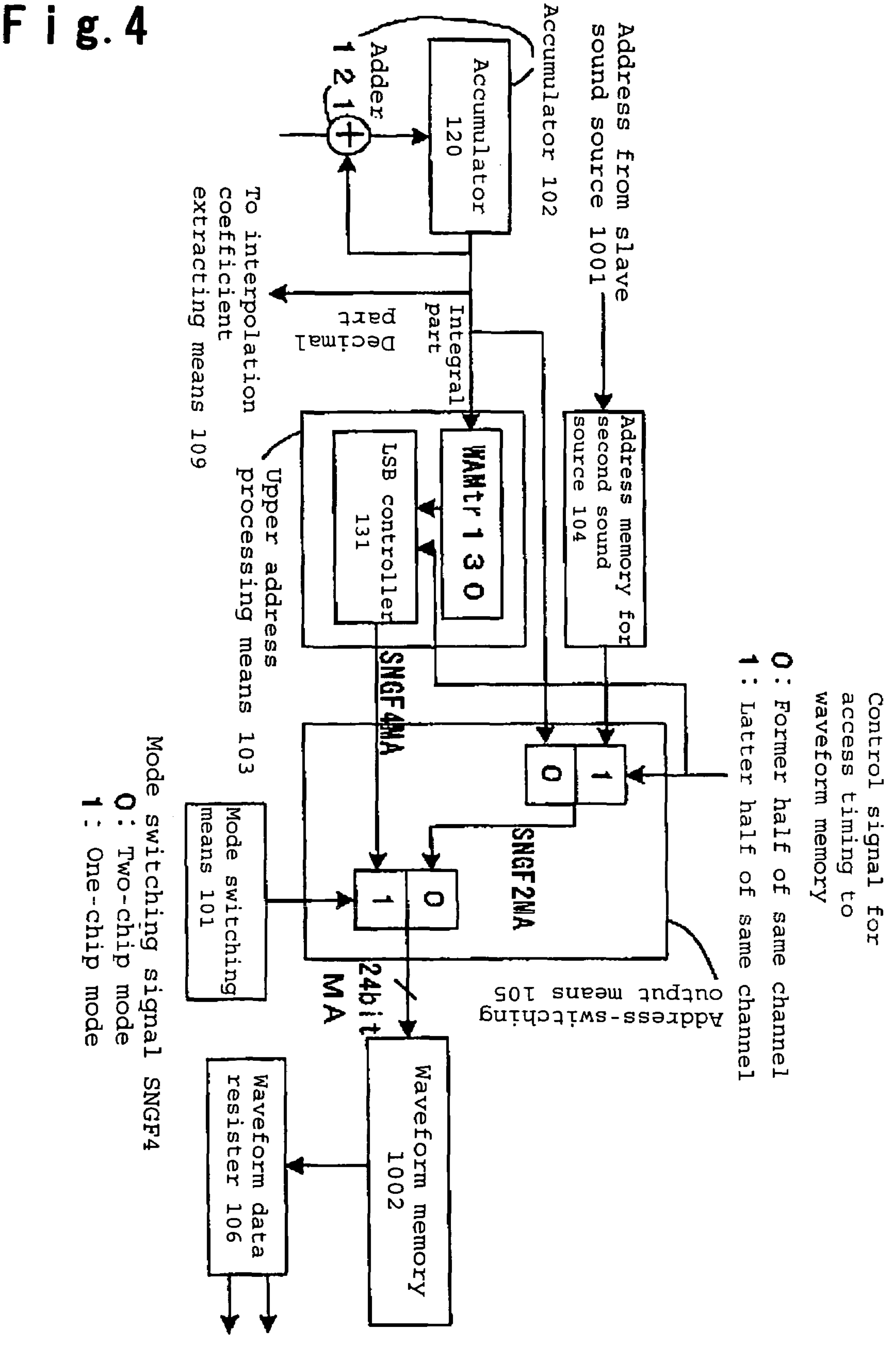
FIG. 4 is a schematic view showing the structures of an upper-address processing section 103 and an address switching output section 105.

The upper-address processing means 103 processes an upper data (integral part) in the accumulator 102 into consecutive addresses. Specifically, the upper-address processing means 103 is composed of a register (WAMtr) 30 and an LSB controller 131 as shown in FIG. 4, and the upper-address processing means rounds an upper data (integral part) output from the accumulator 102, into an even address value to form a first address (the LSB controller 131 processes to mask the value of the least significant bit in the integral part to zero) and generates a consecutive address preceding or following the first address (the LSB controller 131 processes to mask the value of the least significant bit in the integral part to one). Specifically, in accordance with a waveform memory access timing, the first one of the addresses thus generated, which is output from the upper-address processing means 103 in a former half of the same channel (at a timing control signal of 0), is input into the address-switching output means 105 (SNGF4MA), followed by inputting into the same address-switching output means 105 in the latter half of the same channel (at a timing control signal of 1).

The address memory for a second sound source 104 receives a waveform reading-out address value output from the slave sound source 1001 and stores the address value. In the two-chip mode wherein the mode setting signal of the mode switching means 101 is 0, the address value is output as a waveform reading-out address for the slave sound source 1001 from the address-switching output means 105 described later when shifting to the latter half in the same channel with the timing signal for access to the waveform memory 1002 being 1.

The address-switching output means 105 performs switching between an address indicated by an upper data of the accumulator 102 (a reading-out address for the master sound source 1000) and an address stored in the address memory for a second sound source 104 (a reading-out address for the slave sound source 1001) and outputting a selected one of the addresses in response to a mode switching signal from the mode switching means 101 and a timing for access to the waveform memory 1002 (SNGF2MA: address in the two-chip mode, i.e., at the time of SNGF4=0). When the mode switching signal from the mode switching means 101 (SNGF4) indicates the one-chip mode (a mode to use a single sound source) (i.e., when SNGF is equal to 1), a first address, which is obtained by using the upper-address processing means 103 to process an address indicated by an upper data of the accumulator 102 (the value of an integral part wherein the least significant bit is processed to be masked to zero by the LSB controller 131), and a consecutive address preceding or following the first address, which is processed by the upper processing means 103 (a consecutive address preceding or following the first address: the value of the integral part wherein the least significant bit is processed to be masked to one by the LSB controller 131), are output (SNGF4MA).

The waveform data register 106 stores a waveform data read out from the waveform memory 1002 based on an address output as shown in FIG. 2 and FIG. 4. The waveform data register is identified by DWa and DWb in FIG. 5 through FIG. 7 described later.

Figure 5:
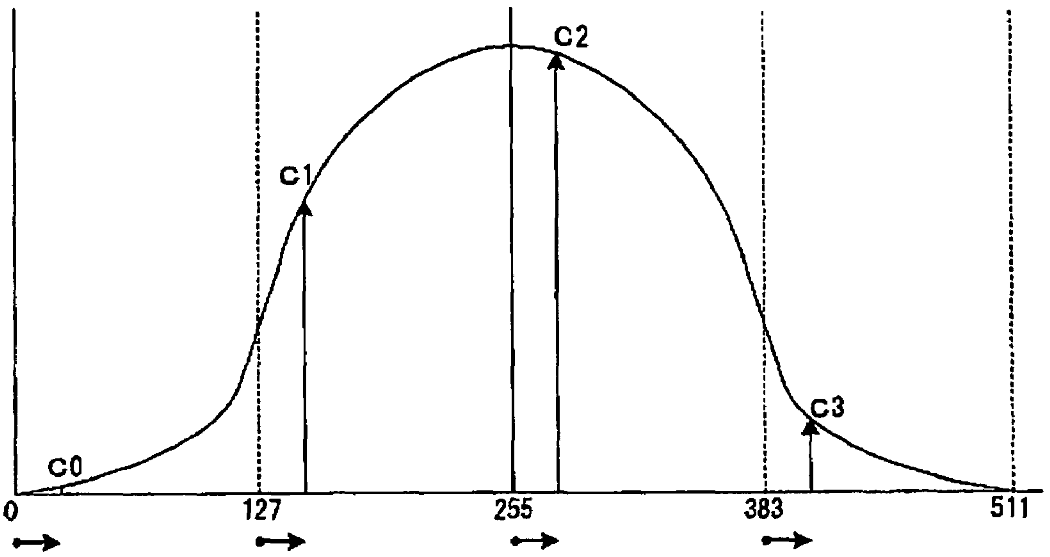
FIG. 5 is a schematic view showing an example of the structure of an interpolation coefficient memory 108 with an interpolation coefficient curve stored therein.
Figure 6:
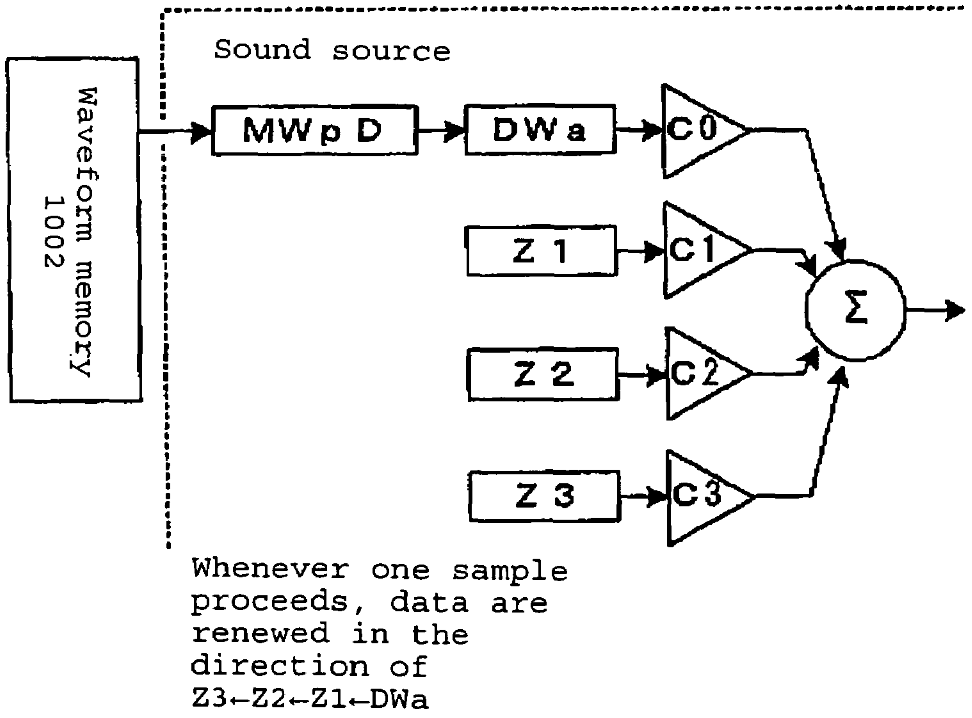
FIG. 6 is a schematic view showing an example of the conventional structure, wherein four-point interpolation is performed using the above-mentioned interpolation curve.
Figure 7:
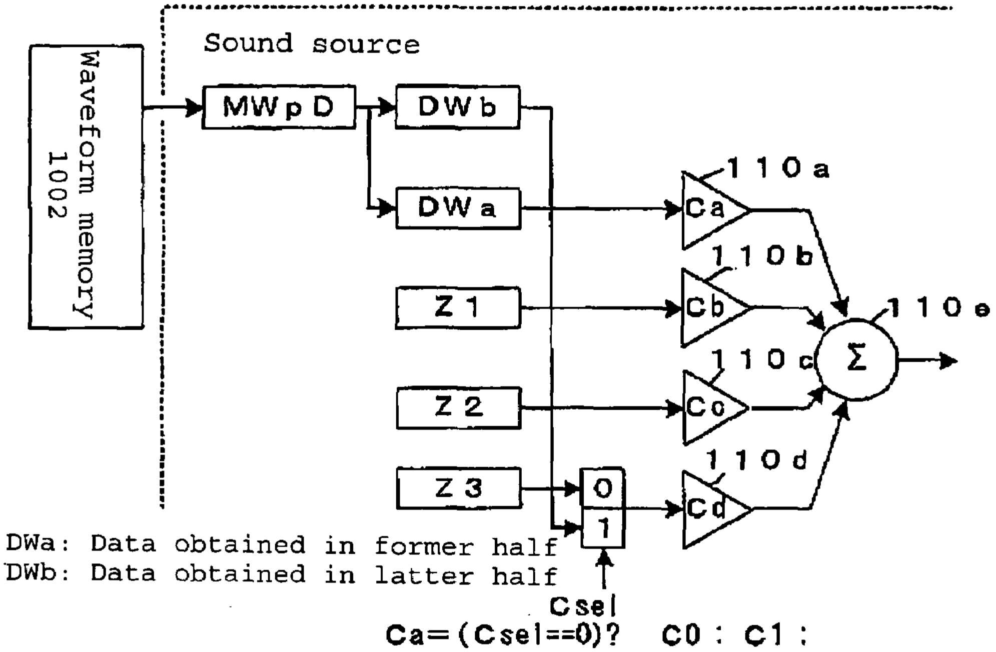
FIG. 7 is a schematic view showing the structure according to a first embodiment of the present invention, wherein four-point interpolation is performed using the above-mentioned interpolation curve.

The sample buffer 107 is a buffer, where waveform data, which have been read out at the previous access timing and have been stored in the waveform data register 106, are stored by (an interpolation point number−1). For example, when the interpolation performed by the sample interpolation means 110 is four-point interpolation, three waveform data before a newly input waveform data are stored. In FIG. 5 through FIG. 7 described later, these three waveform data are identified by Z1, Z2 and Z3. When the interpolation performed by the sample interpolation means 110 is two-point interpolation, one waveform data before a newly input waveform data is stored. The four-point interpolation in the waveform data means that the values of two points before and the values of two points after a destination value are found, and that one point among the four points is used as an interpolated value. On the other hand, the two-point interpolation in the waveform data means that the values of two points before and after a destination value are found, and that an intermediate point between the two points is used as an interpolated value.

The interpolation coefficient memory 108 stores an interpolation coefficient curve as shown in FIG. 5.

The interpolation coefficient extracting means 109 extracts corresponding interpolation coefficients from the interpolation coefficient memory 108, based on lower data (decimal part) in the accumulator 102. Specifically, in the case shown in FIG. 5, the interpolation coefficient curve is stored in 512 words (9 bits) in the interpolation coefficient memory 108. When the memory is address for the interpolation coefficient curve are classified into four groups of from 0 to 127, from 128 to 255, from 256 to 383 and from 384 to 511, and when the decimal part output from the accumulator 102 comprises lower 7 bits, four interpolation coefficients can be simultaneously extracted. In other words, the coefficient value of an address value in from 0+(from 0 to 127) is extracted as a first interpolation coefficient C0, the coefficient value of an address value in from 128+(from 0 to 127) is extracted as a second interpolation coefficient C1, the coefficient value of an address value in from 256+(from 0 to 127) is extracted as a third interpolation coefficient C2, and the coefficient value of an address value in from 384+(from 0 to 127) is extracted as a fourth interpolation coefficient C3.

In a conventional structure wherein normal four-point interpolation is performed, a waveform data, which has been read out from the waveform memory 1002 and has been stored in the waveform data register DWa through a register MWpD, is multiplied by the interpolation coefficient C0, the values of waveform data, which have been read out in sample buffers Z1, Z2 and Z3, are respectively multiplied by the values of the respective interpolation coefficients C1, C2 and C3, and the resulting values are finally accumulated and output as a waveform data as shown in FIG. 6 (renewal is performed so that whenever one sample proceeds, the data stored in the waveform data register DWa is shifted to the sample buffer Z1, the data stored in the sample buffer Z1 is shifted to the sample buffer Z2, and the data stored in the sample buffer Z2 is shifted to the sample buffer Z3). The structure according to the present invention will be described in connection with explanation of FIG. 7 described later.

As shown in FIG. 2, based on interpolation coefficients extracted by the interpolation coefficient extracting means 109, the sample interpolation means 110 interpolate the waveform data, which have been respectively stored in the waveform register 106 and the sample buffer 107. Specifically, the sample interpolation means is composed of multipliers 110*a* to 110*d* and an accumulator 110*e* as shown in FIG. 7 described later. The interpolation way will be described later.

Figure 8:
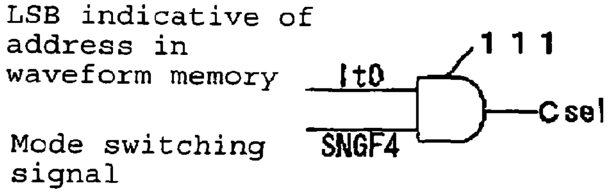
FIG. 8 is a schematic view showing the structure of a selection section 111 and the states of input and output signals in connection with the selection section.

The selection means 111 is composed of an AND circuit for outputting a signal of Csel, as shown in FIG. 8 described later. The waveform data, which have been stored in the sample buffer 107 and the waveform data register 106 and will be input into the multipliers 110*a* to 110*d* of the sample interpolation means 110, are selected by the selection means, in response to a mode switching signal from the mode switching means 101 and LSB as the address value indicated by an upper data of the accumulator 102. This operation will be described, referring to FIG. 7 and FIG. 8.

The interpolation performed by the sample interpolation means 110 according to this embodiment is basically four-point interpolation as well. Ca, Cb, Cc and Cd, which are held in the multipliers 110*a* to 110*d* shown in FIG. 7, are all interpolation coefficients extracted from the interpolation coefficient extracting means 109. A waveform data, which has been read out from the waveform memory 1002, has been stored in the register MWpD. In this figure, the above-mentioned waveform register 106 is identified by references DWa and DWb, and the sample buffer 107 is identified by references Z1, Z2 and Z3.

Figure 9:
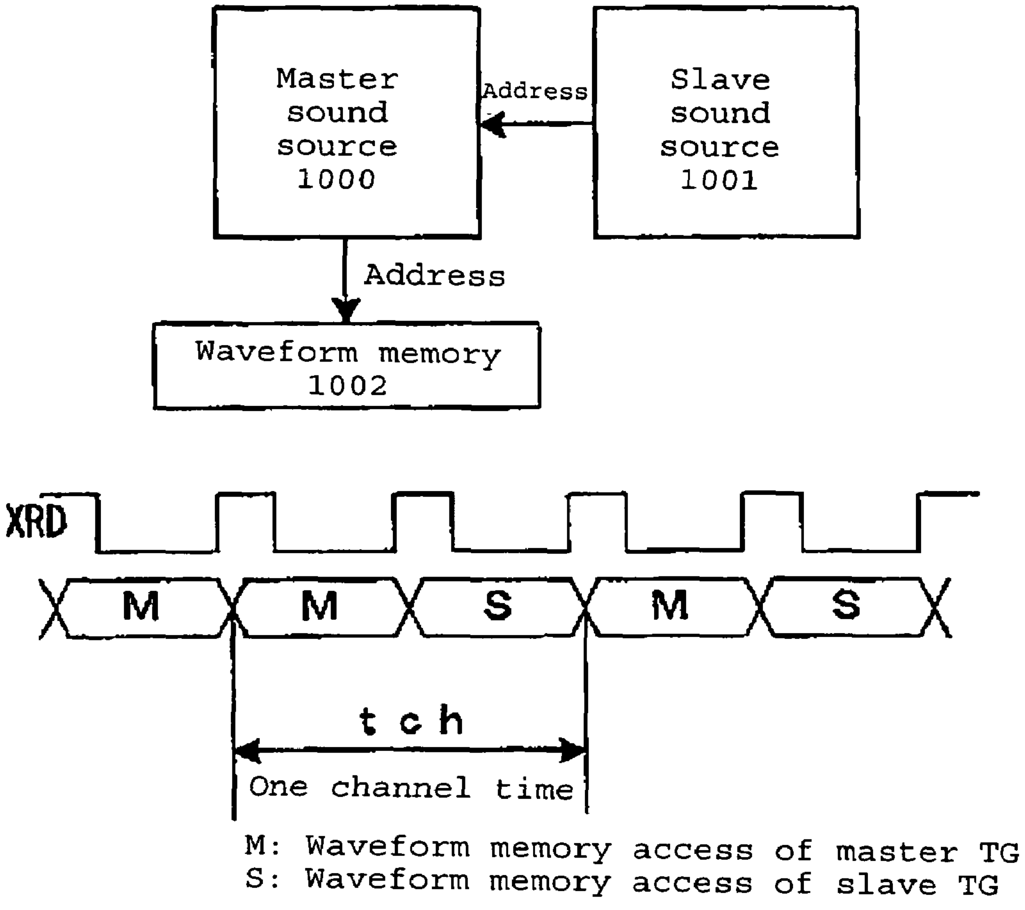
FIG. 9 is a timing chart showing access timing states of the master sound source 1000 and a slave sound source 1001 to a waveform memory 1002 in a two-chip mode in the structure according to this embodiment.

In the two-chip mode, as shown in FIG. 9, the waveform data, which has been designated and read out, based on the upper address (integral part: SNGF2MA) of the accumulator 102 in the master sound source, by the address-switching output means 105 in the former half of the same one channel time, and the waveform data, which has been designated and read out, based on the address stored in the address memory for a second sound source 104 in the master sound source (SNGF2MA), by the address-switching output means 105 in the latter half of the same one channel time, are sequentially obtained in the waveform data register DWa. The other waveform data register DWb is not used.

In the one-chip mode, the waveform data, which has been designated and read out, based on the first address (the value of an integral part obtained by using the LSB controller 131 to mask the least significant bit to zero: SNGF4MA) output form the upper-address processing means 103, by the address-switching output means 105 in the former half of the same one channel time, is obtained in the waveform data register DWa, and the waveform data, which has been designated and read out, based on the address preceding or following the first address and processed by the upper-address processing means 103 (the consecutive address preceding or following the first address, i.e., the value of the integral part obtained by using the LSB controller 131 to mask the least significant bit to one: SNGF4MA), by the address-switching output means 105 in the latter half of the same one channel time, is obtained in the waveform data register DWb.

The selection in the obtaining of a waveform data is performed by the selection means 111 as described above. The switching of the signal of Csel will be described, referring to FIG. 8. Specifically, LSB (the least significant bit: It0) of the upper address (integral part) output from the accumulator 102 in the master sound source 1000 is received, as an input signal, into one of the inputs of the AND circuit, which forms the selection means 111. A mode switching signal (SNGF4: 0 in the two-chip mode, 1 in the one-chip mode) from the mode switching means 101 is received, as the other input signal, into the other input of the AND circuit.

As described above, in a case where the mode switching signal (SNGF4) is 0, even when only the waveform data register DWa is used, and even when LSB (It0) of the upper address is 0 or 1, the signal of Csel outputs "0". As shown in FIG. 9 described above, the waveform data, which has been designated and read out, based on the upper address (integral part) of the accumulator 102 in the master sound source, by the address-switching output means 105 in the former half of the same one channel time, and the waveform data, which has been designated and read out, based on the address stored in the address memory for a second sound source 104 in the master sound source, by the address-switching output means 105 in the latter half of the same one channel time, are sequentially obtained in the waveform data register DWa. Both waveform data, and the previous waveform data which have been stored in the sample buffers Z1, Z2 and Z3 are respectively multiplied by the values of the respective interpolation coefficients C1, C2, C3 and Cd.

On the other hand, in a case where the mode switching signal (SNGF4) is 1, the one-chip mode is performed wherein the waveform data registers DWa and DWb are both used.

When LSB (It0) of the upper address is 0, the signal of Csel outputs "0". The waveform data, which has been read out in the former half of the same channel time by the waveform data register DWa, and the waveform data, which have been stored in the sample buffers Z1, Z2 and Z3, are respectively read out and are multiplied with the interpolation coefficients C1, C2, C3 and Cd by the multipliers 110*a* to 110*d*. The values obtained by performing the multiplication are output.

Upon completion of the operation stated above, as shown in a lower right portion of FIG. 8, renewal is performed so that the data stored in the waveform data register DWb is shifted to the sample buffer Z1, the data stored in the waveform data register DWa is shifted to the sample buffer Z2, and the data stored in the sample buffer Z1 is shifted to the sample buffer Z3 is shifted. In the structure in this embodiment, the three sample buffers are renewed only when two samples (in the address of the accumulator 102) have proceeded. The reason is that it is impossible to obtain continuous samples unless data are constantly read in the order of an odd number and an even number.

When LSB (It0) of the upper address is 1, the signal of Csel outputs "1". The waveform data, which has been read out in the latter of the same channel time by the waveform data register DWb, the waveform data, which have been read out in the former half of the same channel time by the waveform data register DWa, the waveform data, which has been stored in the sample buffer Z1, and the waveform data, which has been stored in the sample buffer Z2, are respectively output and are multiplied with the interpolation coefficients Ca, Cb, Cc and Cd by the multipliers 110*a* to 110*d*. The values obtained by performing the multiplication are output.

Upon completion of the operation stated above, renewal is performed so that the data stored in the waveform data register DWb is shifted to the sample buffer Z1, the data stored in the waveform data register DWa is shifted to the sample buffer Z2, and the data stored in the sample buffer Z1 is shifted to the sample buffer Z3.

In the one-chip mode, operation is performed whenever two access timings (one channel time) lapse. Thus, the above-mentioned operation is repeated every one channel time.

According to the structure of this embodiment described above, when the mode switching means 101 is set in the one-chip mode (=0) to use only the master sound source 1000, based on reference to the one-chip mode flag in the RAM 1103, the first address output from the upper-address processing means 103 is output, as an address to be accessed to the waveform memory 1002 in the former half of the same channel time, by the address-switching output means 105, and the consecutive address following the former address is output, as an address to be accessed to the waveform memory 1002 in the latter half of the same channel time, by the upper-address processing means 103. Based on these addresses, relevant waveform data are read out from the waveform memory 1002 to the waveform data register 106.

When the selection means 111 (the AND circuit in FIG. 8) receives, from the mode switching means 101, information indicating that it is in the one-chip mode, the selection means selects the waveform data in the waveform data register 106 and the sample buffer 107 in connection with every sample according to 0 or 1 in the integral part of the accumulator 102 (LSB of the integral part of the address in the waveform memory 1002) and output the selected waveform data to the multipliers 110*a* to 110*d* in the sample interpolation means 110.

Based on the decimal part (7 bits) in the accumulator 102, the interpolation coefficient extracting means 109 extracts interpolation coefficients for the four-point interpolation from the interpolation coefficient curve (512 words) stored in the interpolation coefficient memory 108, and the extracted interpolation coefficients are output to the multipliers 110*a* to 110*d* in the sample interpolation means 110.

Accordingly, in the multipliers 110*a* to 110*d* in the sample interpolation means 110, the waveform data in the waveform data register 106 as DWa selected by and output from the selection means 111 and the waveform data of Z1, Z2 and Z3 in the sample buffer 107, or the waveform in the waveform data register 106 as DWb and the waveform data of Z1 and Z2 in the sample buffer 107 are multiplied with the extracted interpolation coefficients C0, C1, C2 and C3 and then are accumulated, being output as a waveform data.

Figure 10:
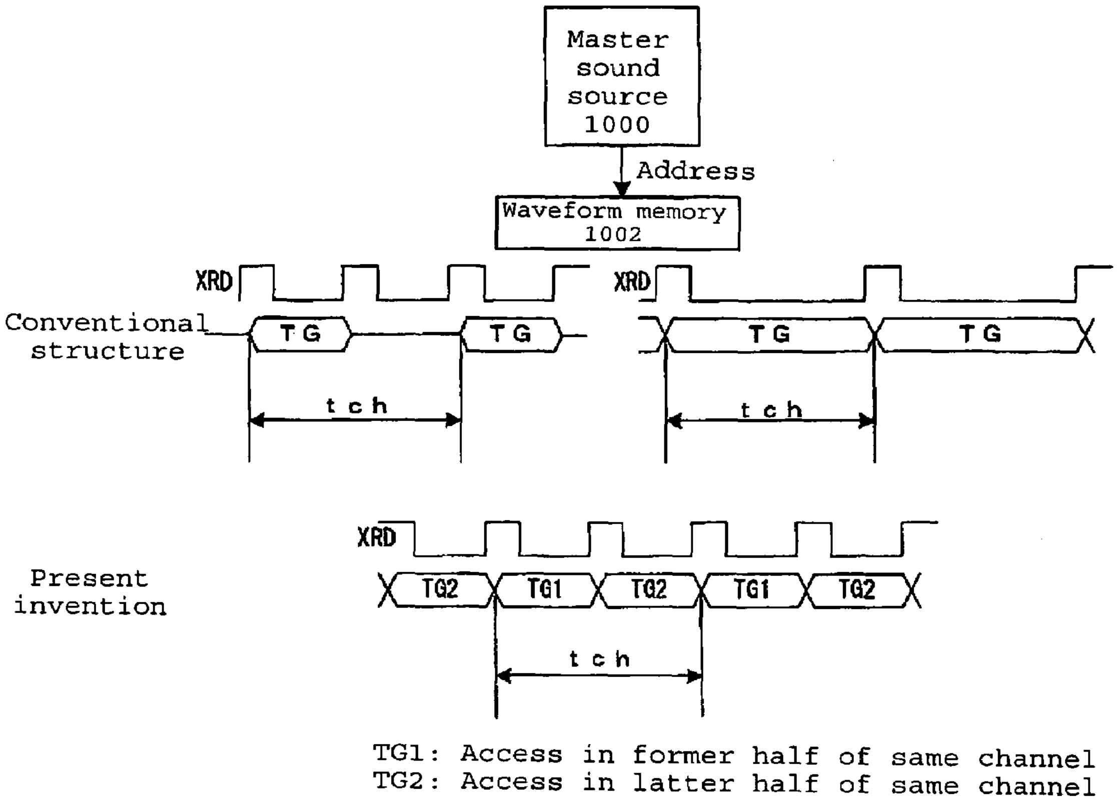
FIG. 10 is a timing chart showing access timing states of the master sound source 1000 to the waveform memory 1002 in a one-chip mode in the structure according to this embodiment and in a conventional structure.

By performing such operation in the one-chip mode, in the same channel time for a channel "t", the waveform data obtained by memory access (TG1) in the former half and the waveform data obtained by memory access (TG2) in the latter half are read out, and the access timing for the unused slave sound source 1001 can be allotted to the access timing for the master sound source 1000 as shown by the timing chart according to the present invention in FIG. 10. Accordingly, the upper limit of the range of reproduced pitches can be expanded by one octave.

On the other hand, in the conventional structure, the access timing for the unused slave sound source 1001 is left as it is (see a left side in a middle portion in FIG. 10), or the access timing for the master sound source 1000 is extended (see a right side in the middle portion in FIG. 10) as shown by the timing chart represented as prior art in the same figure.

Embodiment 2

Figure 11:
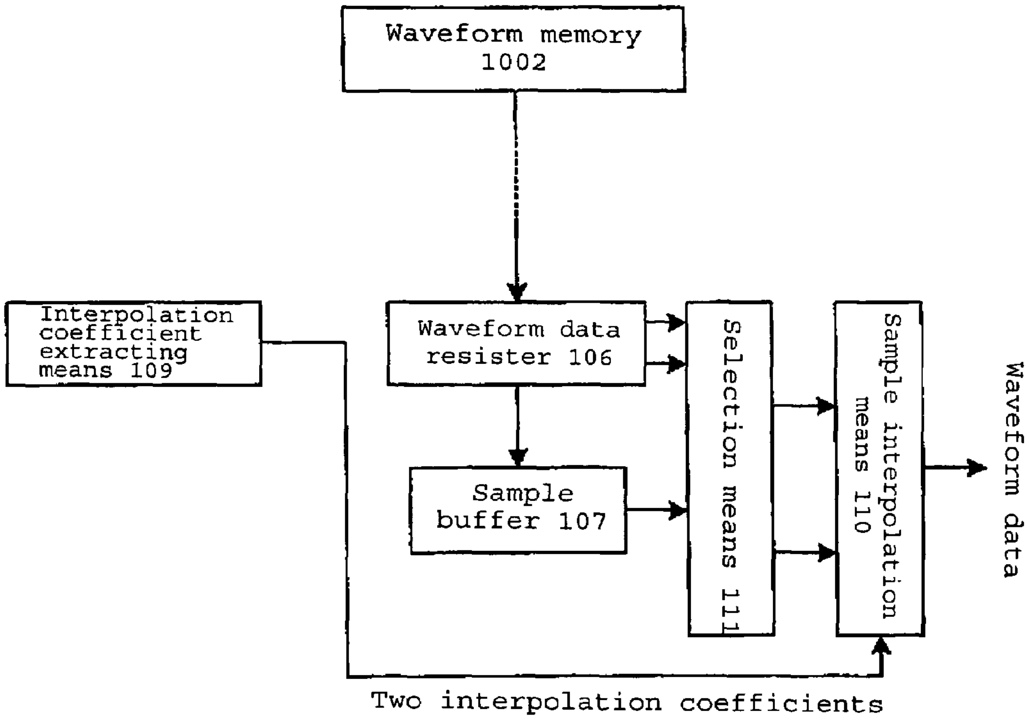
FIG. 11 is a schematic view showing only the interpolation processing of a read-out waveform data in the structure according to a second embodiment of the present invention.
Figure 12:
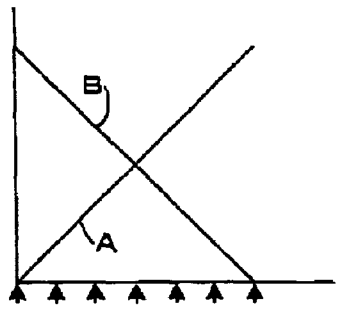
FIG. 12 is a schematic view showing how interpolation coefficient data are stored for two-point interpolation.

FIG. 11 is a schematic view showing only the interpolation processing of a read-out waveform data in another embodiment of the present invention, wherein the interpolation by the sample interpolation means 110 is performed by interpolation processing using two samples. FIG. 12 shows interpolation coefficient data, which are stored in the interpolation coefficient memory 108 for two-point interpolation. At the beginning, an interpolation coefficient A is "0" while an interpolation coefficient B is "1". As the value of the decimal part of the accumulator 102, which is shown with values in the Y-axis direction, increases, the interpolation coefficient A gradually increase while the interpolation coefficient B gradually decreases. The lines showing both interpolation coefficients intersect each other halfway, and the interpolation coefficient A reaches "1" while the interpolation coefficient B reaches "0". After that, both lines reverse their courses and the similar changes are repeated. The interpolation coefficients thus extracted are output, as the coefficients for two-point interpolation, to the sample interpolation means 110.

In the structure according to the above-mentioned second embodiment as well, the access timing for the unused slave sound source 1001 can be allotted to the access timing for the master sound source 1000, although the interpolation processing is performed by two-point interpolation. Accordingly, the upper limit of the range of reproduced pitches can be expanded by one octave as in the structure according to the former embodiment.

Embodiment 3

Figure 13:
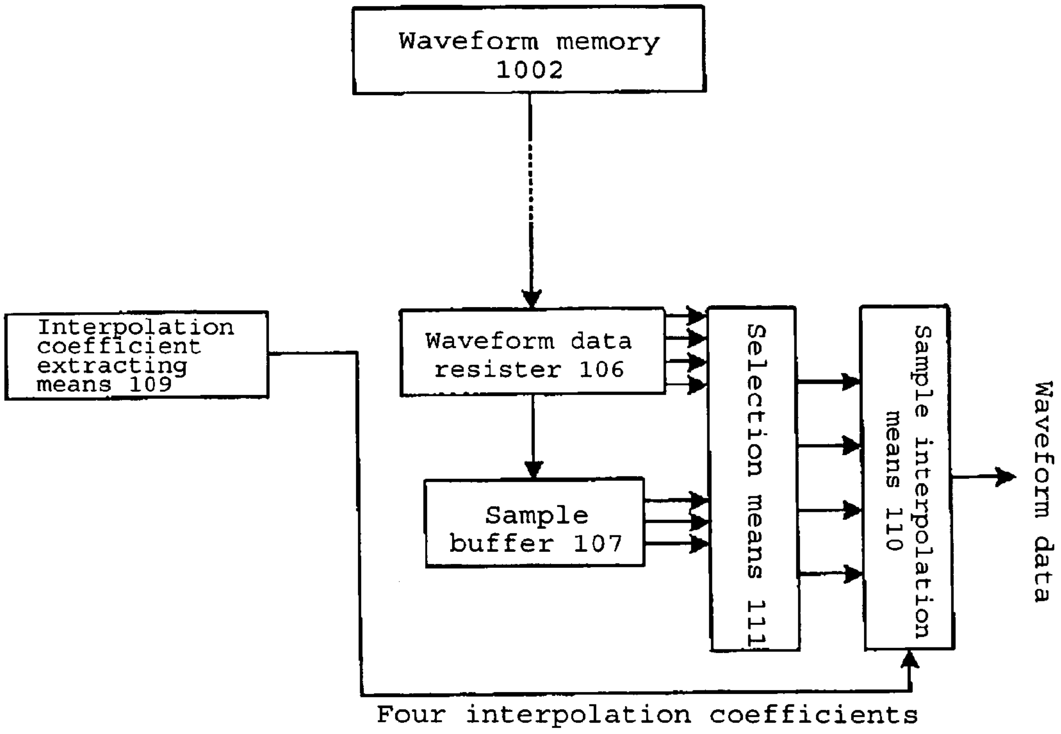
FIG. 13 is a schematic view showing only the interpolation processing of read-out waveform data in the structure according to a third embodiment of the present invention.

FIG. 13 is a schematic view showing only the interpolation processing of read-out waveform data in another embodiment of the present invention, wherein the interpolation by the sample interpolation means 110 is performed by interpolation processing using four samples as in the first embodiment. The structure according to the first embodiment is configured so that the waveform memory has a 16-bit bus and has a data of 16 bits for each sample stored therein. On the other hand, the structure according to this embodiment is configured so that the waveform memory has a 16-bit bus and has a data of 8 bits for each sample stored therein. Accordingly, two waveform data for the respective sound sources are read out in the two-chip mode in the structure according to this embodiment. In the one-chip mode, two waveform data are read out at a single access timing, and totally four waveform data are stored into the waveform data register 106 at the access timings in the former half and the latter half in the same channel. In this case, the registers indicated by references DWa and DWb in FIG. 7 need to comprise four registers DWa to DWd. The data in the waveform register 106 and in the sample buffer 107, which are output to the multiplier of the selection means 111, are four consecutive data among the values of DWd, DWc, DWb, DWa, Z12, Z2 and Z3.

In the structure according to the above-mentioned third embodiment as well, the access timing for the unused slave sound source 1001 can be allotted to the access timing for the master sound source 1000, although totally four waveform data can be stored into the waveform register 106 at the access timings in the former half and the latter half of the same channel. Accordingly, the upper limit of the range of reproduced pitches can be expanded by one octave in the structure according to this embodiment.

Embodiment 4

Figure 14:
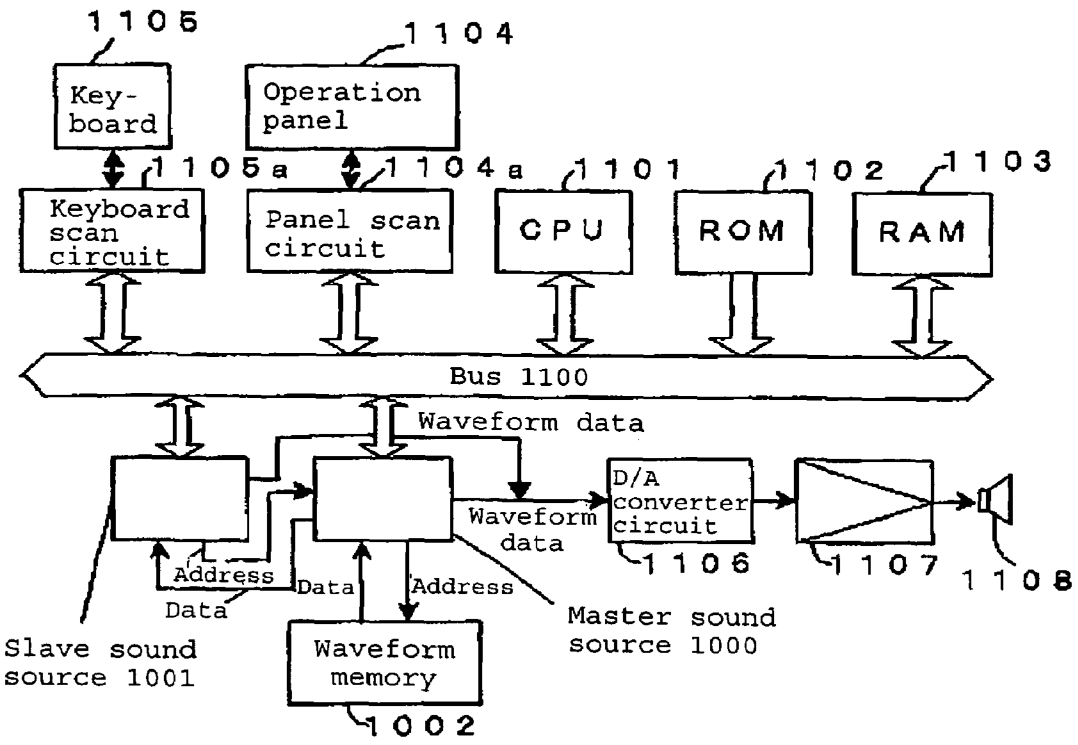
FIG. 14 is a schematic circuit diagram of an electronic musical instrument, to which a waveform reproducing apparatus according to the present invention is applied.

FIG. 14 is a schematic circuit diagram of an electronic musical instrument (such as an electronic organ), to which a waveform reproducing apparatus according to the present invention is applied.

The electronic musical instrument is configured so that different timbres are allotted to upper, middle and lower keyboards, foot pedals or the like, the keyboards being split into left and right portions so as to be capable of setting different timbres at respective positions in both portions. The number of the channels, which are required for simultaneously generating the respective musical tones when pressing, e.g., keys on the keyboard, is beyond the number of the channels required for thirty-two musical tones in many cases.

The electronic musical instrument is configured by interconnecting a CPU 1101, a ROM 1102, a RAM 1103, a panel scan circuit 1104*a*, a keyboard scan circuit 1105*a*, a master sound source 1000 and a slave sound source 1001 through a system bus 1100 as shown in FIG. 14. The system bus 1100 is used for transmitting and receiving an address signal, a data signal, a control signal and the like.

The CPU 1101 controls the entire electronic musical instrument, being operated according to a control program stored in the ROM 1102.

The ROM 1102 stores various kinds of data to be referred to by the CPU 1101 in addition to the above-mentioned control program.

The RAM 1103 is used for temporarily storing various kinds of data when the CPU 1101 performs various kinds of processing. The RAM 1103 has registers, counters, flags and the like defined therein. Explanation will be made about main elements among these elements.

(a) a timbre setting flag: Data are stored to indicate through which channel a timbre generated from the master sound source 1000 or the slave sound source 1001 is generated. This selection is determined by setting on an operation panel 1104 described later.

(b) one-chip mode flag: Although the electronic musical instrument includes the master sound source 1000, the slave sound source 1001 and a waveform memory 1002 commonly used by both sound sources as described later with respect to generation of a musical tone, there are a case where a musical tone is generated only by the master sound source according to the setting on the timbre setting flag, and a case where a player operates the operation panel 1104 to alter the timbre setting flag so as to generate a musical tone only by the master sound source. In this case, the flag is set (=1). At this time, the CPU 1101 refers to the one-chip mode flag and outputs a mode-switching signal (0: two-chip mode, 1: one-chip mode). Although explanation has been made about a structure wherein the mode-switching signal can be altered, the mode-switching signal may be used, being fixed.

The panel scan circuit 1104*a* is connected to the operation panel 1104. The operation panel 1104 has an option to use both of the master sound source 1000 and the slave sound source 1001 in, e.g., a case of increasing the number of simultaneous sound generation, such as a case where thirty-two channels are increased to sixty-four channels (as in a case where the number of timbres to use is large). In such a case, the number of the channels may be set at, e.g., sixty-four channels by setting the timbre setting flag through timbre selection on the operation panel 1104. There is also a case where a player operates the operation panel 1104 to alter the timbre setting flag so as to directly change the one-chip mode flag to the two-chip mode. Although not shown, there are also provided an LED indicator for indicating the setting states of respective switches, an LCD for displaying various kinds of messages, and the like.

When the one-chip mode flag is cancelled in accordance with the above-mentioned channel setting or the operation of the operation panel by a player, the apparatus is set in such a state that the master sound source 1000 and the slave sound source 1001 are both used so as to be capable of performing channel setting with a number beyond thirty-tow channels. When the one-chip mode flag is set in accordance with a change in the above-mentioned channel setting or the operation of the operation panel 1104, the apparatus is set in such a state that only the master sound source 1000 is used so as to be capable of performing channel setting with a number below thirty-two channels.

The panel scan circuit 1104*a* scans each switch on the operation panel 1104 in response to a command from the CPU 1101 and prepares a panel data based on a signal indicative of a switch-on state or a switch-off state of each switch obtained by this scanning operation, each one bit in the panel data corresponding to each switch. For example, each one bit represents the switch-on state by “1” and a switch-off state by “0”. The panel data is transmitted to the CPU 1101 through the system bus 1100. The panel data is used to determine whether the on-event or the off-event of a switch on the operation panel 1104 has been caused or not.

The panel scan circuit 1104*a* transmits a display data from the CPU 1101 to the LED indicator and the LCD on the operation panel 1104. By this operation, according to a data transmitted from the CPU 1101, the LED indicator is turned on or off, and a message is displayed on the LCD.

The keyboard scan circuit 1105*a* detects a key-on data generated at the keyboard 1105. The keyboard 1105 has the respective keys provided with a two-position switch. When it is detected that a key on the keyboard 1105 has been depressed to a certain depth or above, a key-on signal corresponding to the pitch data (key number) of the depressed key is generated, and a velocity is generated based on the speed of the depressed key, which has passed between the two positions. These data are transmitted as key-on data to the keyboard scan circuit 1105*a*. Examples of the two-position switch are an optical sensor, a pressure sensor or other sensors, which can detects that the corresponding key has been depressed to a certain depth or above. When the keyboard scan circuit 1105*a* receives the key-on data from a two-position switch, the keyboard scan circuit transmits the data to the CPU 1101.

Based on the reference to the timbre setting flag and the one-chip mode flag in the RAM 1103 by the CPU 1101, the key-on data, which have been transmitted from the keyboard scan circuit 1105*a*, are transferred to the master sound source 1000, or the master sound source 1000 and the slave sound source 1001 so as to correspond to the respective channels.

The master sound source 1000 and the slave sound source 1001 share the single waveform memory 1002. Both sound sources perform memory access to the waveform memory under the control of a common clock to send a read-out address to the waveform memory 1002 and to read out an original data from the waveform memory. The musical instrument is configured to have such a normal sound source structure that after the original data read-out is interpolated, the interpolated data is multiplied with the envelope for each timbre generated by the same circuit, and the multiplied results are accumulated so as to correspond to the channels with the waveform data of the respective timbres set therein and are output as waveform data. It should be noted that when the musical instrument is played in the two-chip mode, both sound sources 1000 and 1001 have an additional structure, which is used for the waveform memory 1002 outside both sound sources in order to deal with exchange of memory addresses and waveform data between the master sound source and the slave sound source. In other words, the musical instrument is configured so that the address output to be performed by the slave sound source 1001 and the acquisition of the waveform data for the slave sound source are mainly performed by the master sound source 1000.

A waveform data, which has been output from both sound sources, is input into the D/A converter circuit 1106 to be subjected to digital-to-analog conversion, is amplified by the amplifier 1107 and is output as a musical tone to outside through the speaker 1108.

Figure 15:
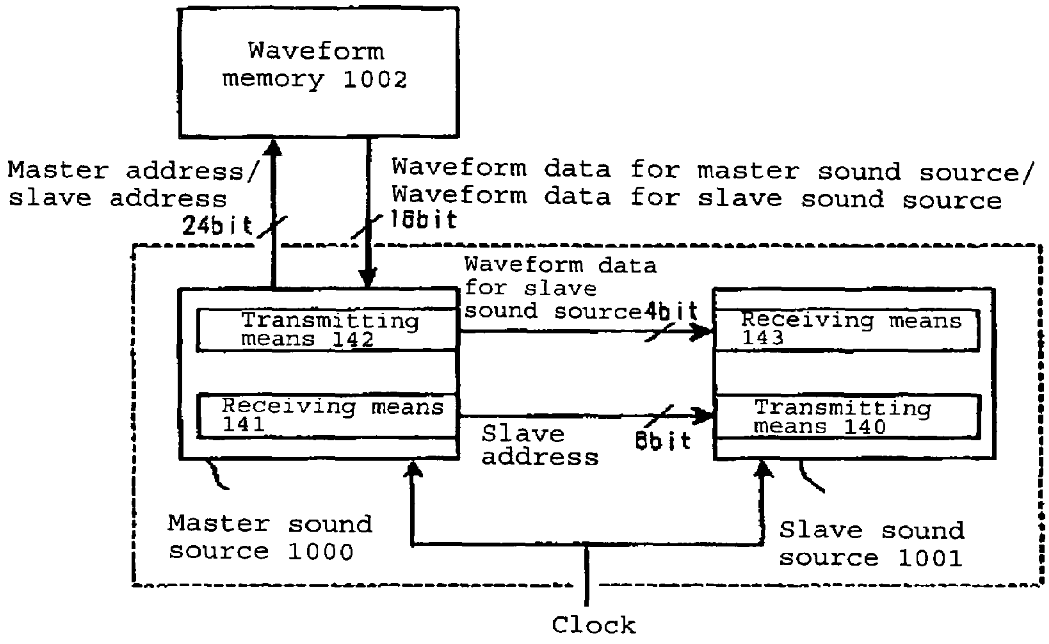
FIG. 15 is a schematic view showing the structure according to an embodiment of the present invention, which is provided in the master sound source 1000 and the slave sound source 1001 in the two-chip mode in connection with the waveform memory 1002.

When the musical instrument is switched to the two-chip mode, the master sound source 1000 and the slave sound source 1001 are configured to have a structure as shown in FIG. 15 in connection with the waveform memory 1002. Specifically, the slave sound source 1001 includes a transmitting means 140 for transmitting a waveform reading slave address to the master sound source 1000, the master sound source 1000 includes a receiving means 141 for receiving the slave address transmitted from the transmitting means 140 of the slave sound source 1001, the master sound source 1000 includes a transmitting means 142 for providing the slave sound source 1001 with a waveform data for the slave sound source read out from the waveform memory 1002, and the slave sound source 1001 includes a receiving means 143 for receiving the waveform data for the slave sound source transmitted from the transmitting means 142 of the master sound source 1000. Both sound sources are designed as a custom-made LSI, and each of the sound sources contains a buffer, a register, a fixed memory for storing predetermined coefficients for interpolation, and the like, which are not shown. The above-mentioned means are composed of these elements. The musical instrument also includes the structure according to Embodiment 5.

Figure 16:
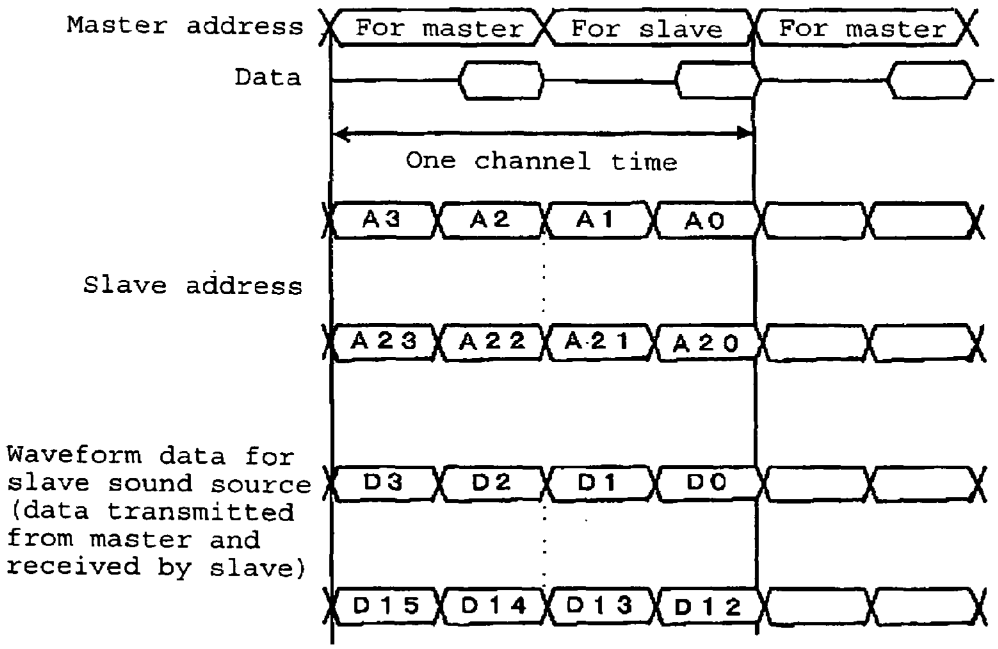
FIG. 16 is a timing chart showing the outputs of memory addresses to the waveform memory 1002 and the reading-out of waveform data from the waveform memory, which are performed by the master sound source 1000 and by the slave sound source 1001 through the master sound source 1000.

As shown in FIG. 15 and FIG. 16, the master sound source 1000 operates so that a master address (indicated by "For master" in FIG. 16), which has been obtained by operation (by accumulation of certain values), is output to the waveform memory 1002 in the former half of the operation time for one channel, and that a slave address (indicated by "For slave" in this figure), which has been transmitted from the transmitting means 140 of the slave sound source 1001 and has been received by the receiving means 141 of the master sound source, is output to the waveform memory 1002 in the latter half of the operation time for the one channel.

On the other hand, in the master sound source 1000, a waveform data for the slave sound source, which has received from the waveform memory 1002, is supplied to the transmitting means 142 of the master sound source 1000 to be transmitted to the receiving means 143 of the slave sound source 1001 in the latter half of the operation time for the one channel.

As described above, the transmitting means 140 of the slave sound source 100 and the receiving means 141 of the master sound source 1000 are serially connected together. A slave addresses A0 to A23 shown in FIG. 16 is transferred to the side of the master sound source 1000 by being subjected to parallel-serial conversion on the side of the slave sound source 1001 to be divided into four sections, being serially transmitted to the master sound source by 6 bits for each one channel time. The slave addresses thus transferred is subjected to serial-parallel conversion on the side of the master sound source 1000 to be transformed into 24 bits. It should be noted that the slave addresses are the addresses of a waveform data for the slave sound source, which will be read out from the waveform memory after this channel.

On the other hand, the transmitting means 142 of the master sound source 100 and the receiving means 143 of the slave sound source 1000 are also serially connected together. A waveform data for the slave sound source D0 to D15 shown in FIG. 16 is subjected to parallel-serial conversion on the side of the master sound source 1000 to be divided into four sections, being serially transmitted to the master sound source by 4 bits for each one channel time. The waveform data for the slave sound source slave thus transferred is subjected to serial-parallel conversion on the side of the slave sound source 1001 to be transformed into 16 bits. It should be noted that the waveform data for the slave sound source are the waveform data for the slave sound source, which have been read out from the waveform memory 1002 and received by the receiving means 143 after this channel.

According to the structure of Embodiment 4 as described above, the master sound source 1000 operates so that a master address, which has been obtained by operation, is output to the waveform memory 1002 in the former half of the operation time for one channel, and that a slave address, which has been transmitted from the transmitting means 140 of the slave sound source 1001 and has been received by the receiving means 141 of the master sound source, is output to the waveform memory 1002 in the latter half of the operation time for the one channel. The master sound source 1000 also operates so that a waveform data for the slave sound source, which has received from the waveform memory 1002, is supplied to the transmitting means 142 of the master sound source 1000 and is transmitted to the receiving means 143 of the slave sound source 1001 in the latter half of the operation time for the one channel.

By this arrangement, the slave sound source 1001 can obtain a waveform data for the slave sound source, without being affected by the memory access cycle time. In other words, the output of an address and the obtaining of a waveform data for the slave sound source, which are supposed to be performed by the slave sound source 1001, are mainly performed by the master sound source 1000. Accordingly, the slave sound source 1001 can reliably obtain such a waveform data for the slave sound source.

Figure 17:
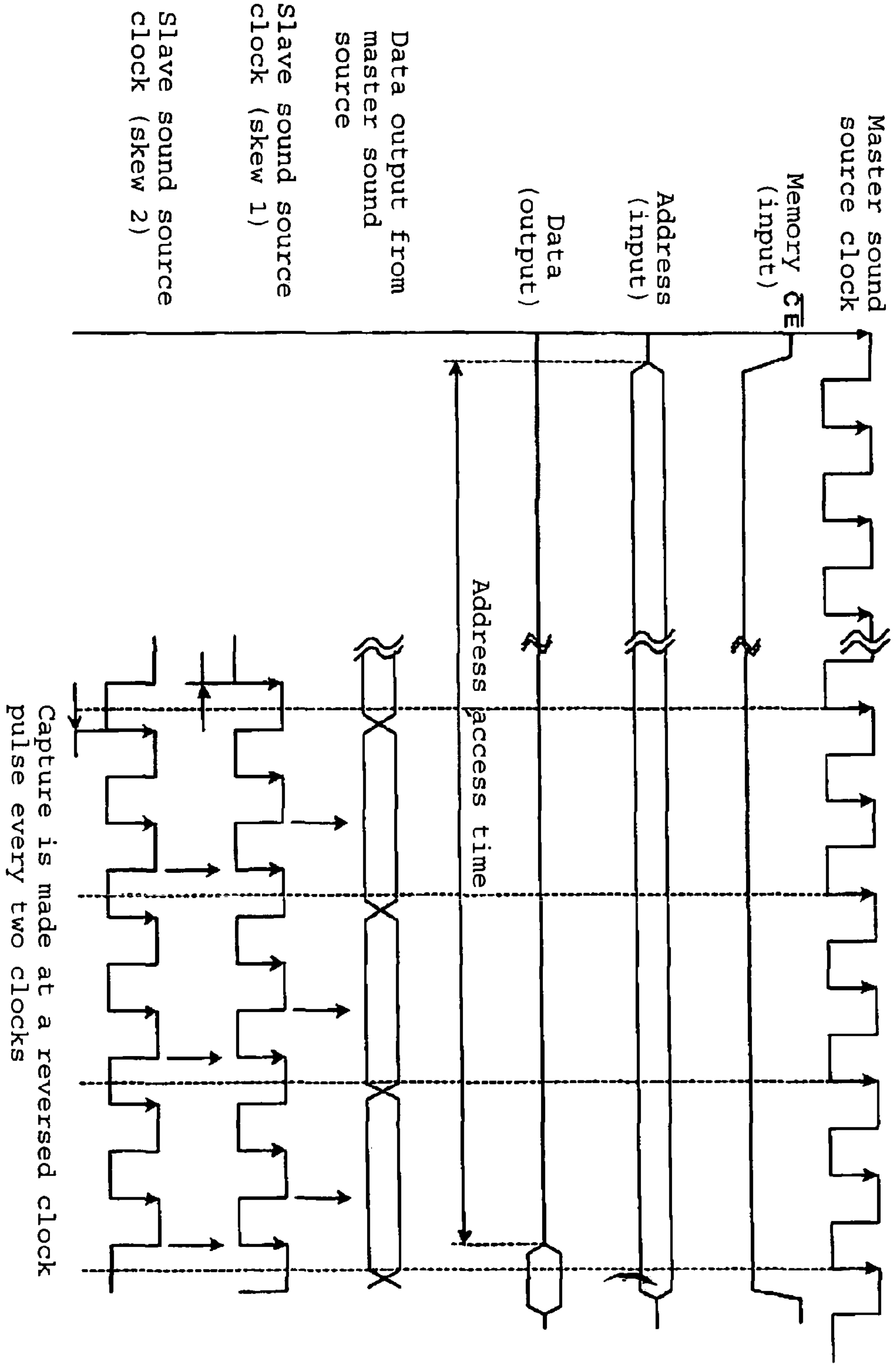
FIG. 17 is a timing chart showing a case where skew is caused between the master sound source 1000 and the slave sound source 1001 in the structure according to this embodiment, the timing chart showing how an address is input from the master sound source 1000 into the waveform memory 1002 and a waveform data is output from the waveform memory 1002 to the master sound source 1000, and how a waveform data for the slave sound source, which is output from the transmitting section 142 of the master sound source 1000, is received by the receiving section 143 of the slave sound source 1001.

FIG. 17 is a timing chart in a case where skew is caused between the master sound source 1000 and the slave sound source 1001 (the case of a forward shift is indicated by "Skew 1", and the case of a backward shift is indicated by "Skew 2") in connection with the clock provided by a single oscillator (not shown) in the structure of Embodiment 4, the timing chart showing how an address is input from the master sound source 1000 into the waveform memory 1002 and a waveform data is output from the waveform memory 1002 to the master sound source (an upper stage in FIG. 17), and how a waveform data for the slave sound source, which is output from the transmitting means 142 of the master sound source 1000, is received by the receiving means 143 of the slave sound source 1001. In this case, the receiving means 143 of the slave sound source 1001, which receives a waveform data for the slave sound source transmitted from the transmitting means 142 of the master sound source 1000, receives the waveform data at an edge of an inverted clock pulse. Likewise, the receiving means 141 of the master sound source 1000, which receives a slave address transmitted from the transmitting means 140 of the slave sound source 1001, receives the slave address at an edge of an inverted clock pulse.

In the structure wherein while both of the master sound source 1000 and the slave sound source 1001 share the waveform memory 1002 in the two-chip mode, the master sound source 1000 controls the access to the waveform memory to perform serial transmission and reception between the master sound source and the slave sound source, the timing for receiving a serial data on the side of the slave sound source 1001 is designated by an edge of an inverted clock pulse. Accordingly, it is possible to finely set the timing in a case where the time for the one channel (which is used for serial transmission) is short, as in a case where there are only eight clock pulses as in Embodiment 4.

Figure 18:
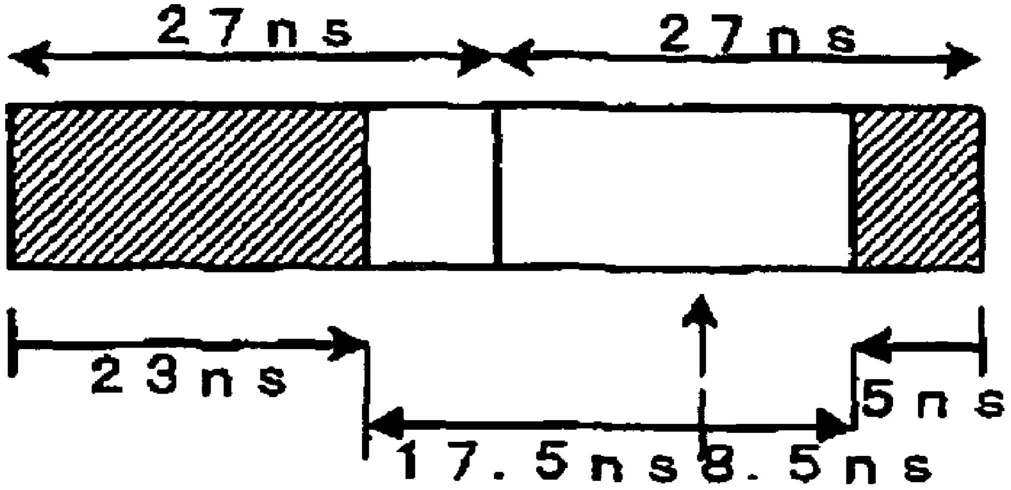
FIG. 18 is a schematic view showing how the slave sound source captures a waveform data in the structure according to this embodiment.
Figure 26:
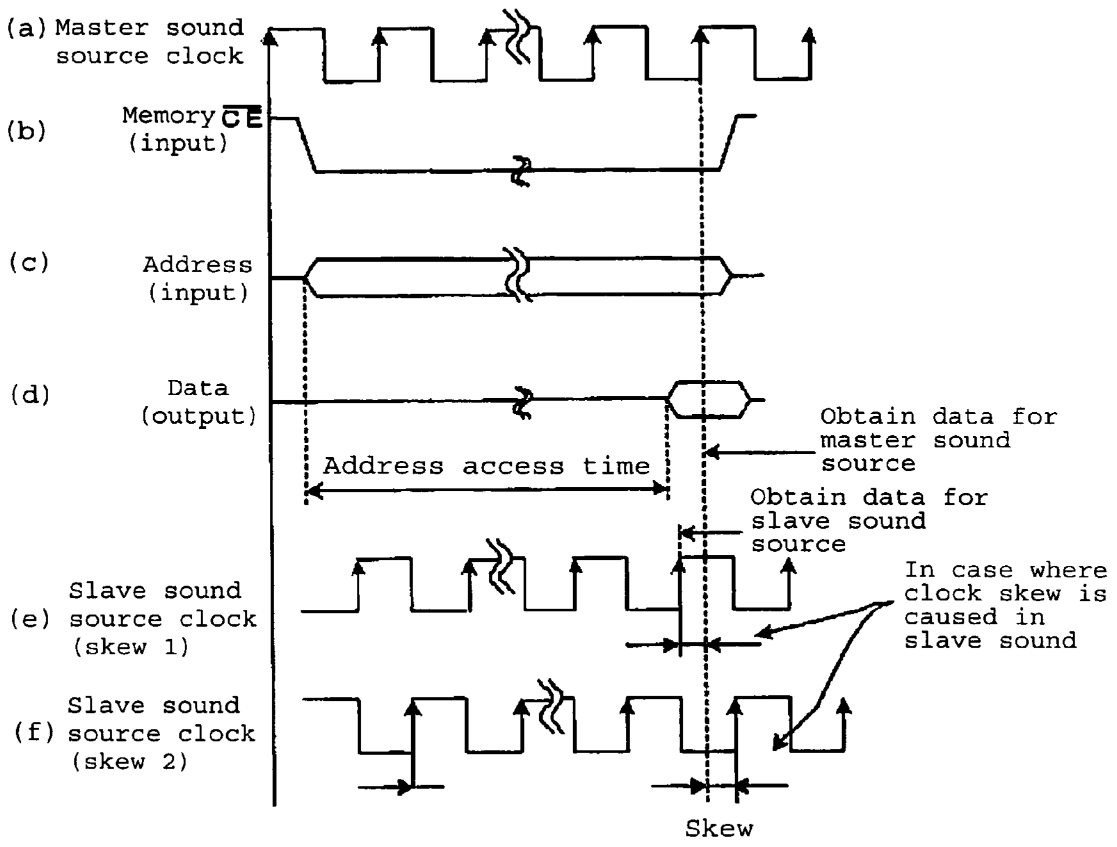
FIG. 26 is a schematic view showing a state wherein skew is caused between the system clocks of the two chip sound sources in a two-chip mode in a conventional structure, which is composed of two-chip sound sources sharing a waveform data memory and being simultaneously used.

Even when calculation is made on assumption that in the above-mentioned structure, the transmitting means 142 on the side of the master sound source 1000 transmits a data with one bit in two clock pulse widths (one clock pulse=27 ns), that the receiving means 143 of the slave sound source 1001 receives the data at an edge of an inverted clock pulse, that a delay in output form the master sound source 1000 is 23 ns and that the setup time on the side of the slave sound source 1001 is 5 ns, there is an enough time of 26 ns left as shown in FIG. 18. From this point of view, it is enough to receive the data in this time period. In this regard, it is possible to have a significant advantage in comparison with the conventional structure shown in FIG. 26.

In the structure of Embodiment 4 described above, both of the master sound source 1000 and the slave sound source 1001 are composed in a single chip of LSI. In this embodiment, both sound sources are configured as described above in the two-chip mode, and only the sound source 1000 performs the output of an address and the capture of a data with respect to the waveform memory 1002 in the one-chip mode.

Embodiment 5

The recent trend in commonly used electronic circuits is to collect electronic circuits having different functions into a one-chip system LSI (to collect units having different functions into a one chip in a TV set or a personal computer) in order to cope with an increase in power consumption and a decrease in processing speed, which are caused when circuits having different functions are connected on a substrate.

However, terminals are extended on the order of tens to hundreds in a one chip in an structure wherein a sound source 1000 or 1001 is composed as a one-chip of LSI, plural sound source chips having the same functional circuit are used in order to increase the number of simultaneous sound generation, and the output of an address and the acquaintance of a waveform data for the slave sound source, which are supposed to be performed by the slave sound source 1001, are mainly performed by the master sound source 1000.

Figure 19:
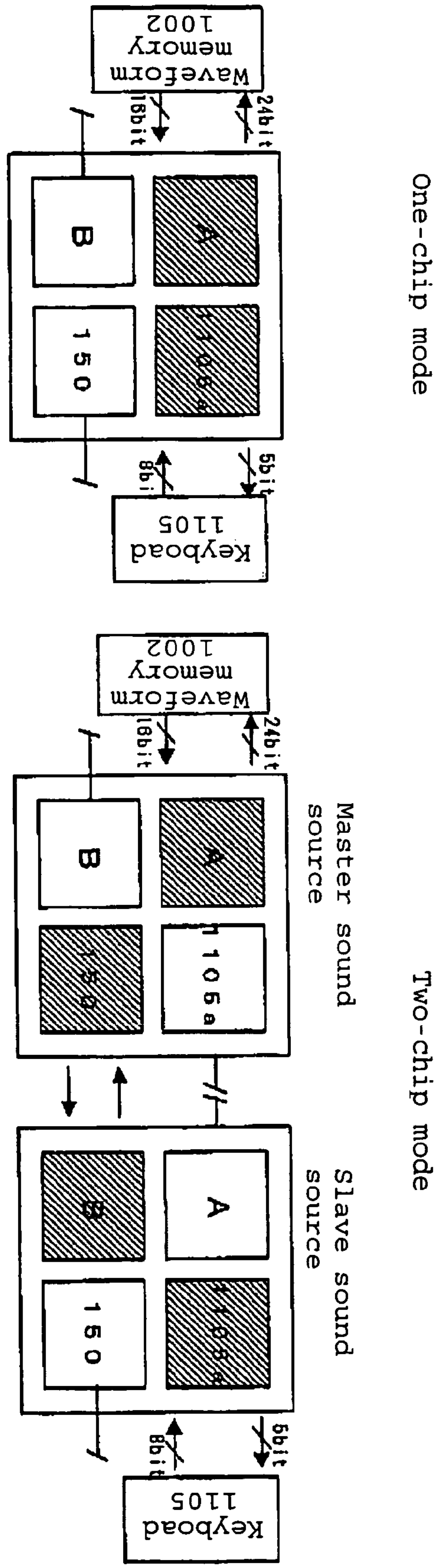
FIG. 19 is a schematic view showing how terminals are interconnected in the one-chip mode and the two-chip mode when an electronic musical instrument is composed for a system LSI including the sound sources and another structure having an electronic musical instrument function.

When chips, which have at least one terminal extended for every function, are used to be combined together, there are many terminals for unused functions. For example, it is assumed that as shown in FIG. 19, four functions of an external memory access circuit A having twenty-four output terminals and sixteen input terminals, an address-output/data-input unit B having seven output terminals and four input terminals for the slave sound source, a key board scan circuit 1105*a* having five output terminals and eight input terminals, and a data-output/address-input unit 150 having four output terminals and seven input terminals for the master sound source comprise a sound source composed of a one-chip system LSI.

Now, explanation will be made about the function of the key board scan circuit 1105*a*. When ON/OFF data on the switches of one-hundred and twenty-eight keys of the keyboard 1105 are time-divisionally scanned by four keys at a time, five scan signals (five bits, the number of the output terminals of the circuit 115*a* being 5, $2^5=32$) are decoded, and thirty-two timings are generated. Four keys are checked at a time. Since each key has two switches, eight ON/OFF data (the number of the input terminals of the circuit 115*a* being 8) are simultaneously captured (eight bits).

When the sound source having such a structure is used in the one-chip mode, the functions of the external memory access circuit A and of the keyboard scan circuit 1105*a* are activated by connection with the waveform memory 1002 and the keyboard 1105. On the other hand, the functions of the address output/data input unit B for the slave sound source and of the data-output/address-input unit 150 for the master sound source are in an inactive state (having no connection with other circuits)

Even when the sound source having such an structure is used in the two-chip mode, the respective functions of the external memory access circuit A and of the keyboard scan circuit 1105*a* are effective, and both sound sources are connected so that the data-output/address-input unit 150 for the master sound source on the side of the master sound source and the address-output/data-input unit B for the slave sound source on the side of the slave sound source are connected together and used. On the other hand, the functions of the address-output/data-input unit B for the slave sound source and of the keyboard scan circuit 1105*a* on the side of the master sound source, and the functions of the external memory access circuit A and of the data-output/address-input unit 150 for the master sound source on the side of the slave sound source are set in an inactive state, respectively.

For this reason, when the apparatus is configured so that in order that the sound sources are composed of a one-chip LSI and that the number of simultaneous sound generation is increased, both sound source chips having the same functional circuit structure are formed on a single substrate, and when the output of an address and the acquaintance of a waveform data for the slave sound source, which are supposed to be performed by the slave sound source, are mainly performed by the master sound source as described above, designing of the circuit substrate for connecting the terminals of the one-chip LSI is complicated since the terminals are extended on the order of tens to hundreds.

Figure 20:
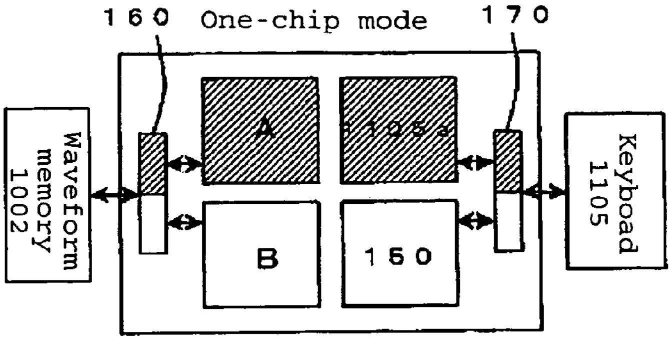
FIG. 20 is a schematic view showing how terminals are interconnected in the one-chip mode when switching sections are used to improve the structure shown in FIG. 19.
Figure 21:
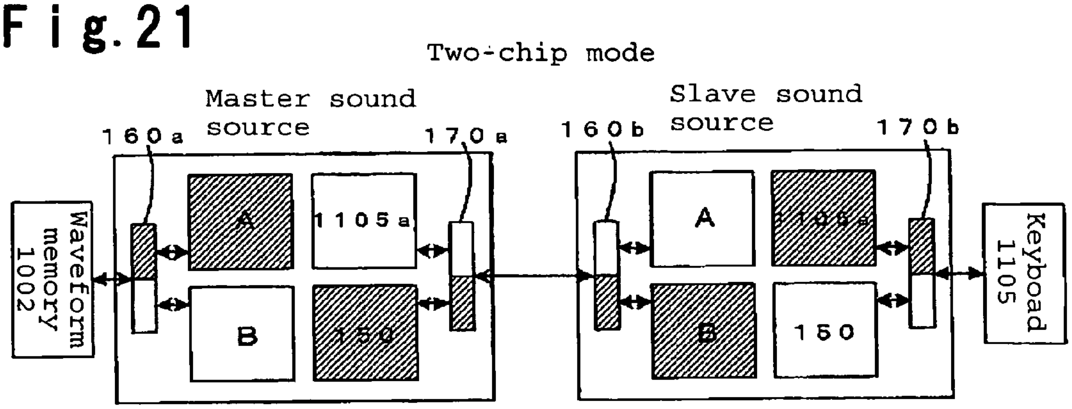
FIG. 21 is a schematic view showing how terminals are interconnected in the two-chip mode when switching sections are used to improve the structure shown in FIG. 19.
Figure 22:
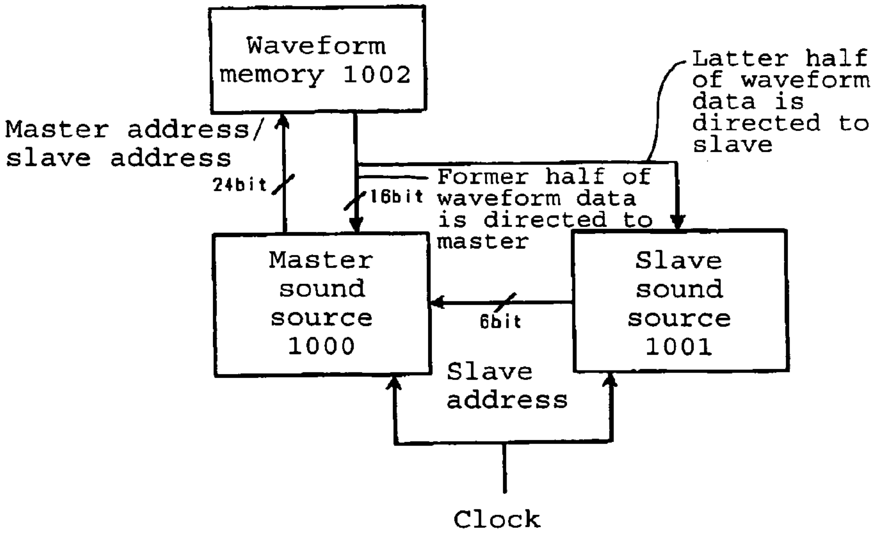
FIG. 22 is a schematic view showing a conventional structure, which uses the two sound source chips 100 and 101 sharing a waveform memory 1002 in a two-chip mode, and showing how an address and data are output and input between the master sound source 1000 and the slave sound source 1001, respectively.
Figure 23:
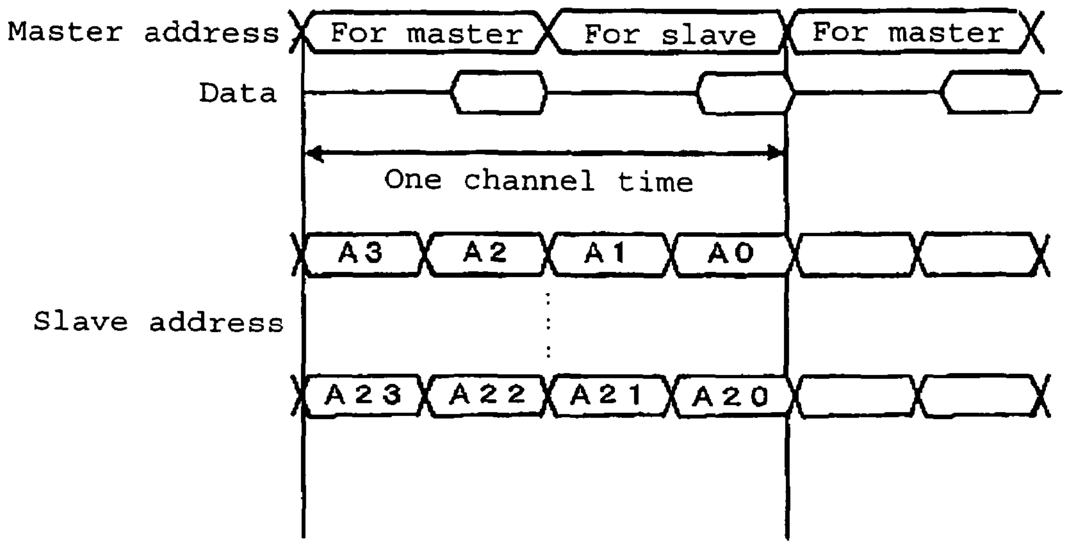
FIG. 23 is a timing chart in the conventional structure and showing the outputs of memory addresses and the reading-out of waveform data, which are performed by the master sound source 1000 and the slave sound source 1001.
Figure 24:
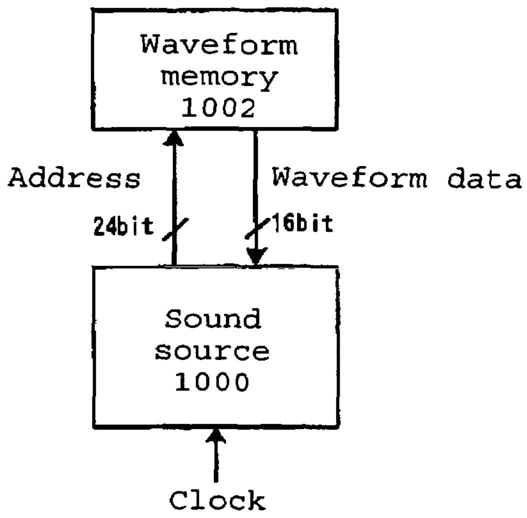
FIG. 24 is a schematic view showing a state wherein the operation has been changed into a one-chip mode using only the sound source 1000 in the conventional structure.
Figure 25:
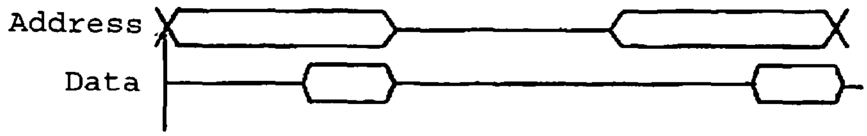
FIG. 25 is a timing chart showing how the sound source is operated when the operation has been changed into the one-chip mode.

In order to cope with this problem, as shown in FIG. 20 and FIG. 21, switching means 160, 160*a*, 160*b*, 170, 170*a* and 170*b*, which are respectively capable of switching the input/out terminals of the respective functions of the respective chips, are provided, and the terminals, which are not used in the two-chip mode (the respective terminals of the keyboard scan circuit 1105*a* on the side of the master sound source and the respective terminals of the external memory access circuit A on the side of the slave sound source in FIG. 20 and FIG. 21), are used, being allotted to transmittance and reception of a slave address and a waveform data for the slave sound source.

By adopting the above-mentioned structure, the transmittance and reception of an address and a waveform data for the slave sound source can be performed with an increase in the number of the output/input terminals being minimized, and consequently it is possible to avoid waste in design of a circuit substrate. It should be noted that the one-chip mode shown in FIG. 20 is not different from the one-chip mode shown in FIG. 19 previously described, in terms of circuit.

It should be noted that the musical tone generating apparatus according to the present invention is not limited to the embodiments described above and shown. It is understood that changes and variations may be made without departing from the spirit of the present invention.

INDUSTRIAL APPLICABILITY

The present invention is applicable not only to an electronic musical instrument but also to a structure including sound source chips having a function of sharing a waveform memory.

The invention claimed is:

1. A musical tone generating apparatus, which includes sound sources capable of reading out a waveform from a waveform memory at a plurality of access timings in a timing for one channel, comprising:

a mode switching means for performing switching between a mode to use a solo sound source and a mode to use a plurality of sound sources;

an accumulator for accumulating designated pitches;

an upper-address processing means for processing an upper data in the accumulator into consecutive addresses;

an address memory for a second sound source, the address memory receiving an address to the waveform memory generated from a second sound source and storing the address therein;

an address-switching output means for performing switching between a first address indicated by an upper data of the accumulator and a second address stored in the address memory for a second sound source and outputting a selected one of the addresses in response to a mode switching signal from the mode switching means and an access timing, the address-switching output means outputting the first address and a consecutive address in the mode to use a solo sound source, the consecutive address being processed to precede or follow the first address by the upper-address processing section;

a waveform data register for storing a waveform data read out from the waveform memory based on an output address;

a sample buffer wherein waveform data, which have been read out at the previous access timing and have been stored in the waveform data register, are stored by (an interpolation point number−1);

an interpolation coefficient memory for storing interpolation coefficient data;

an interpolation coefficient extracting means for extracting corresponding interpolation coefficients from the interpolation coefficient memory, based on lower data in the accumulator;

a sample interpolation means, wherein the waveform data, which have been respectively stored in the waveform register and the sample buffer, are subjected to interpolation based on interpolation coefficients extracted by the interpolation coefficient extracting means; and a selection means, wherein the waveform data, which have been respectively stored in the waveform register and the sample buffer and have been input into the sample interpolation means, are selected in response to a mode switching signal from the mode switching section and an address value indicated by the upper data of the accumulator.

2. The musical tone generating apparatus according to claim 1, wherein the interpolation performed by the sample interpolation section is four-point interpolation.

3. A musical tone generating apparatus, which includes a master sound source serving as a master in memory access and a slave sound source serving as a slave in the memory access, both sound sources performing the memory access to a waveform memory with a common clock; comprising:

the slave sound source including a transmitting means for transmitting a slave address for reading out a waveform, to the master sound source;

the master sound source including a receiving means for receiving the slave address transmitted from the transmitting means of the slave sound source;

the master sound source including a transmitting means for transmitting a waveform data for the slave sound source to the slave sound source, the waveform data being read out form the waveform memory;

the slave sound source including a receiving means for receiving the waveform data for the slave sound source, which has been transmitted from the transmitting means of the master sound source;

wherein the master sound source operates so that a master address, which has been obtained by operation, is output to the waveform memory in the former half of the operation time for one channel, and that a slave address, which has been transmitted from the transmitting means of the slave sound source and has been received by the receiving means of the master sound source, is output to the waveform memory in the latter half of the operation time for the one channel, and the master sound source also operates so that a waveform data for the slave sound source, which has received from the waveform memory, is supplied to the transmitting means of the master sound source and is transmitted to the receiving means of the slave sound source in the latter half of the operation time for the one channel.

4. The musical tone generating apparatus according to claim 3, wherein the receiving means of the master sound source, which receives the slave address transmitted from the transmitting means of the slave sound source, receives the slave address at an edge of an inverted clock pulse, and wherein the receiving means of the slave sound source, which receives the waveform data for the slave sound source transmitted from the transmitting means of the master sound source, receives the waveform data at an edge of an inverted clock pulse.

* * * * *